(12) United States Patent
Hayward et al.

(10) Patent No.: US 7,077,015 B2
(45) Date of Patent: *Jul. 18, 2006

(54) APPARATUS TO REPRODUCE TACTILE SENSATIONS

(76) Inventors: Vincent Hayward, 2277 Harvard, Montréal, Québec (CA) H4A 2W1; Jérome Pasquero, 3455 Aylmer, Apt. 504, Montréal, Québec (CA) H2X 2B5; Vincent Levesque, 1955 Liebert, Montréal, Québec (CA) H1L 5P7

( * ) Notice: Subject to any disclaimer, the term of this patent is extended or adjusted under 35 U.S.C. 154(b) by 0 days.

This patent is subject to a terminal disclaimer.

(21) Appl. No.: 10/447,263

(22) Filed: May 29, 2003

(65) Prior Publication Data

US 2004/0237669 A1 Dec. 2, 2004

(51) Int. Cl.
*G01D 7/00* (2006.01)
(52) U.S. Cl. .................................. 73/862.041
(58) Field of Classification Search ........... 73/862.624, 73/862.634, 862.632, 862.639, 862.637, 73/862.636, 862.629, 862.041, 862.042, 73/862.043, 862.044, 862.045, 862.046
See application file for complete search history.

(56) References Cited

U.S. PATENT DOCUMENTS

| | | | |
|---|---|---|---|
| 4,833,776 A | 5/1989 | Wakamiya et al. | |
| 5,165,897 A * | 11/1992 | Johnson | 434/113 |
| 5,449,292 A * | 9/1995 | Tani et al. | 434/114 |
| 5,466,154 A | 11/1995 | Thompson | |
| 5,467,975 A | 11/1995 | Hadimioglu et al. | |
| 5,489,812 A | 2/1996 | Furuhata et al. | |
| 5,580,251 A | 12/1996 | Gilkes et al. | |
| 5,685,721 A | 11/1997 | Decker | |
| 5,717,423 A | 2/1998 | Parker | |
| 5,979,892 A | 11/1999 | Smith | |
| 6,022,022 A | 2/2000 | Haugen | |
| 6,445,284 B1 * | 9/2002 | Cruz-Hernandez et al. | 340/407.1 |
| 6,693,516 B1 * | 2/2004 | Hayward | 340/407.1 |
| 6,693,616 B1 | 2/2004 | Hayward | |

FOREIGN PATENT DOCUMENTS

EP 1161931 A1 * 12/2001

* cited by examiner

*Primary Examiner*—Max Noori
(74) *Attorney, Agent, or Firm*—David J. French

(57) ABSTRACT

A tactile sensing transducer provides as its output a skin deformation signal for storage or transmission to a tactile stimulation display transducer. A skin surface imaging means operating optically, acoustically or otherwise is positioned for viewing and providing an output image signal corresponding to said deformed skin surface. An electronic processing means connected to said imaging means provides an output skin deformation signal corresponding to the deformation of said skin. The display transducer may incorporate a plurality of individually actuatable, bendable cantilevered arms mounted in line on a base support, each of the arms having tip ends which are displaceable, upon actuation, to provide a tactile display.

6 Claims, 21 Drawing Sheets

APPARATUS TO REPRODUCE TACTILE SENSATIONS

FIELD OF THE INVENTION

The present invention relates to a general method to record and to artificially reproduce tactile sensations experienced while touching and sliding a finger or other tactilely sensate objects over a surface.

BACKGROUND TO THE INVENTION

It is well known that scenes and objects can be imaged in such manner that the resulting images may be recorded or projected for simultaneous or subsequent viewing using a refreshable screen, locally or at distance. Imaging is normally achieved by measuring illumination coming from many directions within a viewing angle. It is also well known that rapid sequences of still images give rise to the impression of continuous motion, therefore, moving scenes can be recorded and projected. Similarly, sound waves can be picked up by measuring the air velocity or the air pressure at one or several locations and transforming these quantities into a signal that can be recorded for differed reproduction or amplified for immediate reproduction by a loudspeaker, locally or at distance. It is thus natural to desire similar functions for tactile sensations.

To date, this has been achieved by measuring the net movement of—and/or the net force applied to—an object which is made to come into contact with a surface and then to reproduce these signals using a device capable of reproducing them. Such device, as it is well known, is termed a haptic device because it combines sensitivity to the user's movements and production of signals in return of these movements. These devices are however limited by the necessity to consider an intervening object between the skin of the user and the surface being touched, both during recording and reproduction.

This limitation was addressed in the past by providing artificial tactile sensors that performed a function similar to that of the natural skin. These devices specifically operated by measuring the distributed deformation of a deformable surface which is brought into contact with the surface of an external object, typically by means of an array of pressure sensitive sites and by recording their individual responses. These responses were reproduced by a tactile display device which reproduced the original deformation using another array of pressure causing and/or deformation causing contactors. The present state of the art is limited by the manufacturing difficulties of both artificial tactile sensors and tactile displays. Hence, there is a need to provide an improved method to record and reproduce tactile sensations.

Returning to the analogy of recording and reproducing visual or audio signals, it is observed that optical waves or sound waves can be picked up with instruments which are disconnected from the persons experiencing the results of this signals. Appropriate recordings can be made without the need of directly measuring the image projected on the retina or by directly measuring the waves taking place in the cochlea. In these two cases, instruments such a cameras and microphones can be constructed to accomplish substantially similar functions as eyes and ears. However, constructing devices which accomplish a similar function as that of the skin is difficult and onerous. Appropriate visual or auditory reproduction can be accomplished using screens that are viewed or speakers which are listen to and are which are disconnected from the persons using them. Tactile sensations differ from these cases because they originate from the contact of the skin with the surface of objects. Hence recordings which depend on the knowledge of the deformation of the skin while it is in contact with objects is conveniently done by measuring skin deformation over time directly. Then, reproduction can be done by causing deformations that are similar to those that were recorded. Thus it is the object of the present invention to provide for methods and devices to accomplish both skin deformation measurements over time and to recreate similar deformations over time.

The applications of the present invention include but are not limited to human machine interfaces, games and entertainment, computer peripherals, training simulators, virtual simulators, remote operations, telepresence, rehabilitation, sensory substitution, sensory amplification, data mining, vehicle driving and piloting, e-commerce, musical instruments, records making, documentation, document browsing, medical diagnosis, scientific instruments, pleasure inducing devices, biometry, among many other possible uses.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

According to one aspect of the invention, advantage is taken of a new tactile stimulation display transducer which is preferably made of a single plate of piezoelectric bimorph. The plate is cut in a comb shape. The bimorph has two outer electrodes, one on each side. These are cut such that each tooth's electrodes are isolated from those of the next tooth. Each tooth can be independently actuated to transfer forces to a finger in contact with their free tip. Many such transducers can be combined to form a larger array of skin engaging tips.

SUMMARY OF THE INVENTION

According to this aspect, the invention may be used in conjunction with a tactile sensing transducer comprising:
a) a contacting surface to receive and deform the surface of human skin;
b) skin surface imaging means position for viewing and providing an output image signal corresponding to said deformed skin surface, and
c) electronic processing means connected to said imaging means for providing an output skin deformation signal corresponding to the deformation of said skin for delivery of the output skin deformation signal to a storage means for storing said output signal, or to a tactile stimulation display transducer to form on the surface of skin presented to said display transducer deformations that correspond to the deformations represented by said skin deformation signal.

The invention may be applied to the case where the skin is the pad of a finger that presents a fingerprint pattern whereby the image includes an image of the fingerprint pattern and the skin deformation signal corresponds to the deformation of the skin. Or the skin may be overlaid with a visible pattern that presents an image visible to the skin surface imaging means to provide the skin deformation signal. The invention may be applied to the case where the skin comprises pores distributed over the skin surface and the image includes an image of these pores which is then used to generate the skin deformation signal.

The skin surface imaging means may be based upon a prism, a light source and an optical imaging device or may rely on acoustic or other known imaging means. In the case where the contacting surface is textured the light source preferably provides diffuse light, including, for example, light provided by a scialitic mirror.

The electronic processing means may provide the output skin deformation signal from said image signal by comparison with a known image of the skin in a relaxed state, or it may operate by receiving a plurality of images obtained from skin surface which is in motion in respect of said contact surface. This latter procedure is particularly suited to the case where the contacting surface is textured to provide changes in the deformation of the human skin when such skin is in moving contact with the contacting surface.

The tactile sensing transducer may be employed in combination with a tactile stimulation display transducer having a common base support and a plurality of individually actuatable bendable cantilevered arms mounted in line on said base support, each of the arms having tip ends which are displaceable, upon actuation, from their initial positions in the line of arms. In one preferred variant the tip ends are displaceable, upon actuation, laterally. i.e. transversely, to the line of arms.

According to another preferred the arms each have a base end at which the arms are mounted on the common base support, the arms being wider at their base ends than at their tip ends. Additionally, the tip ends may be aligned along a straight line, or they may be aligned along a curved line.

According to one aspect, the invention an area tactile stimulation display device, or "area tactile displace device", is formed by assembling a plurality of tactile stimulation display devices arranged in first and second sub-arrays wherein respective member devices of the first and second sub-arrays are positioned to intersect with each other. Such intersection may be at a range of angles, but preferably is orthogonal.

By a further feature of the invention the tactile sensing transducer and tactile stimulation display transducer may be combined, with the tactile stimulation display transducer being in the form of the preferred tactile stimulation display transducer as described above.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
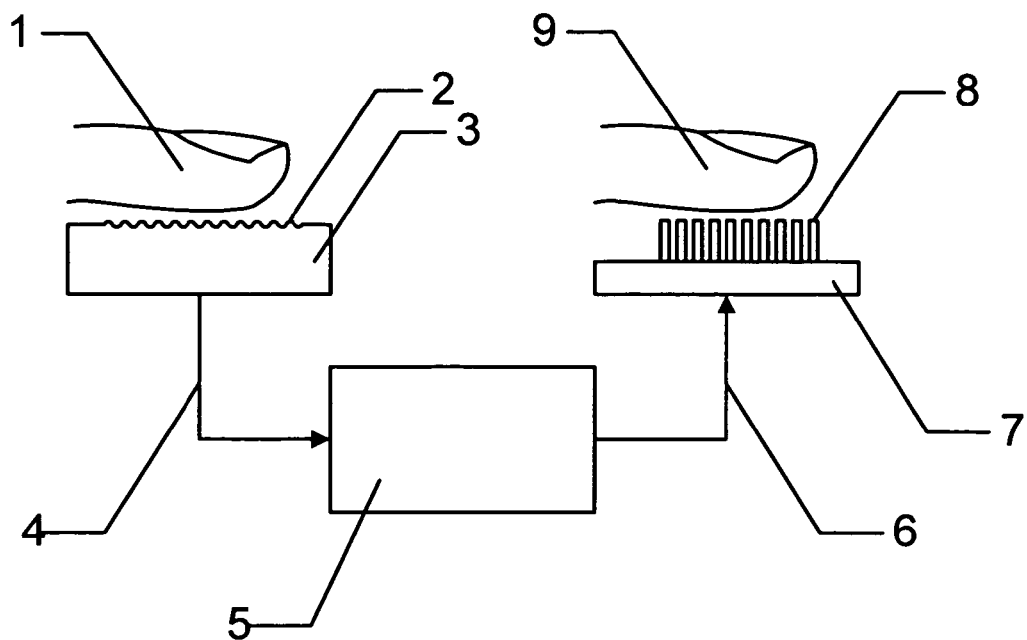
FIG. 1 shows a first finger whose owner experiences tactile sensations arising from contacting a surface and a recording device capable of measuring the deformation of the skin of the first finger. The signals indicative of this deformation are recorded or processed. A display device uses these signals to causing similar deformations at the surface of the skin of second finger whose owner in turn experiences sensations that are similar to those experienced by the owner of the first finger.

With reference to FIG. 1 there is provided a skin deformation recording unit 3 which incorporates a surface 2 contacting a first finger 1 touching and possibly sliding on the surface 2. The surface 2 may be flat or endowed with features. Unit 3 produces signals indicative of features associated with the portion of the skin of finger 1 in contact with surface 2. Naturally, when a finger contacts a surface, within certain limits, the surface of the skin of finger 1 will adopt the same shape as that of the surface 2. Hence the skin of finger 1 is deformed from its original shape in order to espouse the shape of the surface 2. It can readily be observed that for a great variety of shapes the skin of a finger reproduces exactly the shape of a contacted surface. This is especially true if the shape of the surface does not change too abruptly and if it is composed of raised features. When these features are recessed or have sharp edges, the contact may not be intimate. However, unit 3 may be able to track a substantial portion of the contacting skin.

It is further observed that the skin is a deformable medium backed with tissues that provide support apparently capable of causing the skin of deform in a variety of ways. In the course of these deformations the area of each individual path of skin must change and/or undergo shear deformation even when the skin is sliding on a flat surface. This is partly because the volume of the finger must remain substantially invariant since it is incompressible and partly because contact is made with a surface that has friction. Nevertheless, regardless of the cause of the change of area of each individual patches of skin it is observed that these area changes and shear changes are a determining factor for the tactile sensations experienced by the owner of the finger 1.

Hence, unit 3 is configured to measure these changes and encode them into signals suitable for processing, storage and transmission by unit 5 which reads the signals produced by unit 3 via the data link 4. Unit 5 is configured to track features at the surface of the skin which arise naturally such a ridges, valley bifurcations, valley endings, minutiae, pores, or features which have been created artificially using ink, fluorescent dyes and other marking materials applied in a pattern using marking tips or by spraying fluids through a stencil. Unit 5 processes the signals received via link 4 to estimate the deformation of the skin such as area changes or shear deformations while finger 1 contacts surface 2. These deformation are in turned processed to drive an array of actuated skin contactors 8 mounted on unit 7 via a second data link 6. This processing is such that the deformation caused to the skin of second finger 9 resemble the deformation of the skin of finger 1. Hence the owner of finger 9 will experience tactile sensation that resemble those experienced by the owner of finger 1 while touching surface 2. It is noted that the owner of finger 1 may be the same person as the owner of finger 9 or may be different persons.

Figure 2:
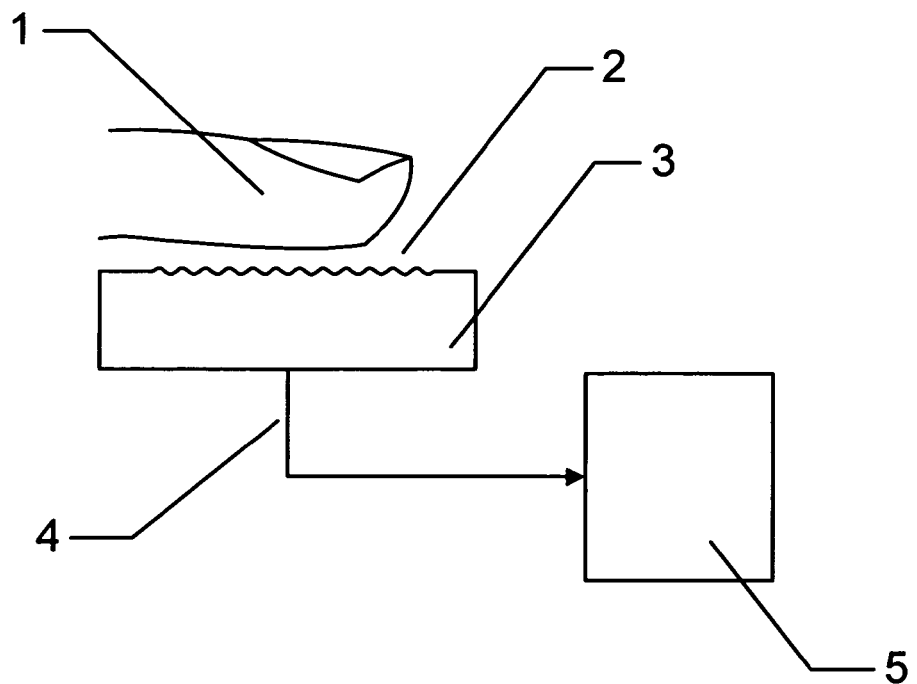
FIG. 2 shows a finger experiencing skin deformation caused by a display device receiving signals which have been previously recorded and processed or are artificially produced.
Figure 3:
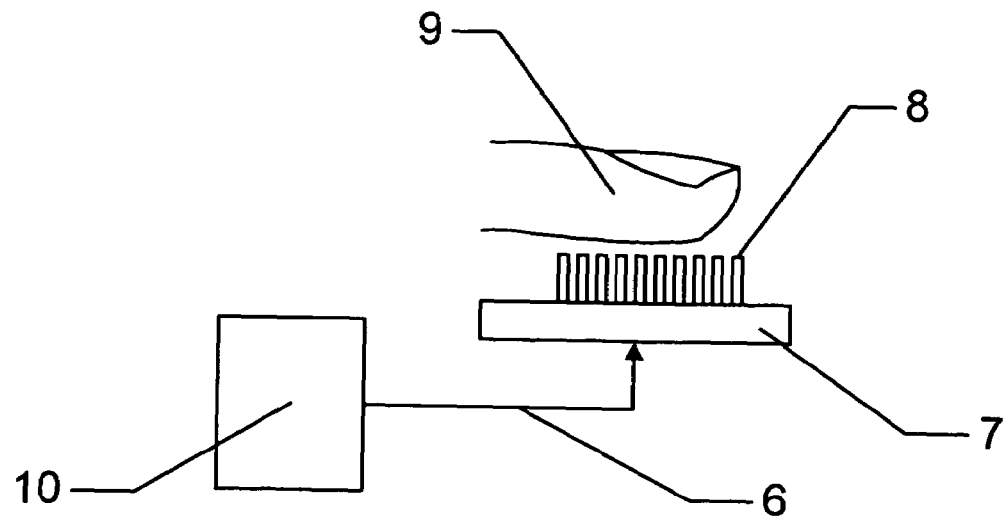
FIG. 3 shows a finger contacting a surface and device capable of measuring and recording these deformations.

With reference with FIG. 2, there is provided a unit 3 which operates like that depicted on FIG. 1. Unit 3 is therefore in a position to produce signals transmitted over data link 4 which are indicative of the tactile sensation experienced by the owner of finger 1. These signals may then be processed and stored for later uses. One such use is to allow investigations to be made about the mechanical and sensorial properties of the skin. One other use is to allow for the identification of the individual who has produced, or is producing, the signals measured by unit 3. With reference to FIG. 3, there is provided a unit 10 which is configured to create signals transmitted over link 6 to a unit 7 similar to that shown on FIG. 1 on which an array of actuated skin contactors 8 is mounted. Unit 10 is therefore in a position to create intangible sensations since they may never have been experienced while touching actual material objects. When properly configured, unit 10 is also in a position to reproduce sensations that resemble sensations which where already recorded.

Thus, it is needed to provide a measurement technique of skin deformation over time that relies on the tracking of landmarks on a fingertip sliding over a surface which can be flat or have simple geometrical features. This results in tactile movies that can be reproduced by a tactile display that relies on the principle of distributed lateral skin deformation.

In the field of fingerprinting there are techniques to acquire high-contrast fingerprint images and extract salient features resulting from anatomical landmarks as they contact a surface: pores, valley endings, and valley bifurcations. However, these techniques are not appropriate for the present purpose because they do not permit sufficient resolution, both in space and in time, which is needed for further processing involving the tracking of features in order to measure skin strain variations over time. Methods appropriate for static imaging with artificial landmarks have been described (Dandekar and Srinivasan 1997), and as mentioned, a wide variety of fingerprint imagers have been developed for biometric applications including optical sensors, solid-state sensors (capacitive or thermal) and ultrasound sensors (Jain and Pankanti, 2001), but these are not appropriate for the purpose of finger pad skin deformation analysis which requires high spatial and temporal resolution as well as imaging through a featured contact surface that has geometrical features.

Figure 4:
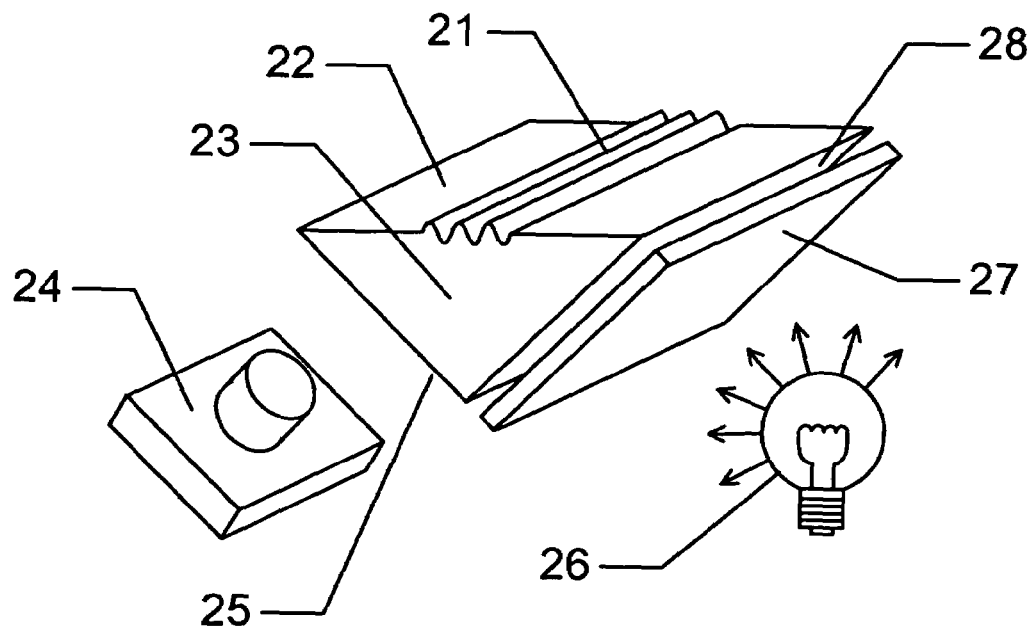
FIG. 4 shows the principle of an optical device capable of measuring the deformation of the skin of a finger.

One preferred method to realize measurements related to skin deformation is shown on FIG. 4. A prism 23 is configured to have its hypotenuse face 22 exposed so it can be touched. Face 22 may optionally have shapes designed to create tactile sensations. The prism 23 has side 28 exposed so that light 29 coming from light source 26 can enter it. Face 25 is also exposed so light can exit and be captured by a camera 24 or other imaging sensor. Such disposition is known to those who are skilled in the art because camera 24 is in a position to acquire high contrast images of a finger print. This principle is already known as Frustrated Total Internal Reflection and its operation can be readily be understood. A ray of light entering face 26 is completely reflected by a flat face 22 since this ray of light strikes a glass-air dioptre at an angle smaller than the critical angle. However if a flexible object such as skin touches face 22, the surface of contact between face 22 and the flexible object will disrupt the glass-air dioptre such that a ray of light striking this surface will no longer be reflected in its entirety in the direction of the camera. Such surface of contact then appears black as imaged by camera. Therefore, a black fingerprint will appear on a bright background. The frustrated total internal reflection principle breaks down if face 22 is not flat.

There is provided a diffuser 27 which is configured to redirect the rays of light coming from light source 26 in many possible directions. These rays penetrate face 28 at many possible angles and hence strike face 22 with many possible angles. Most of these rays will still be totally reflected by side 22, except at places where a flexible object touches it. In this condition, surface 22 is permitted to be shaped, for example in the form of grooves 21 and still produce high contrast images of a finger print. Grooves 22 may be grinded and polished to a sufficient optical finish. The size of the diffuser limits the angles at which light can strike the surface and thus constrains the maximum surface gradient. It can be shown that these constraints practically limit variations in the surface height to one dimension.

It is important to use a powerful light source to insure a sufficient depth of field in order to maintain focus on the finger pad image which is viewed at an angle. It is however possible to correct for geometric distortions by imaging a calibration grid. The pattern resulting from the grid is analyzed to correct the perspective projection, 'unroll' the contact surface, and measure pixel size. The intensity of fingerprint valleys is also normalized to compensate for illumination non-uniformity.

Figure 5:
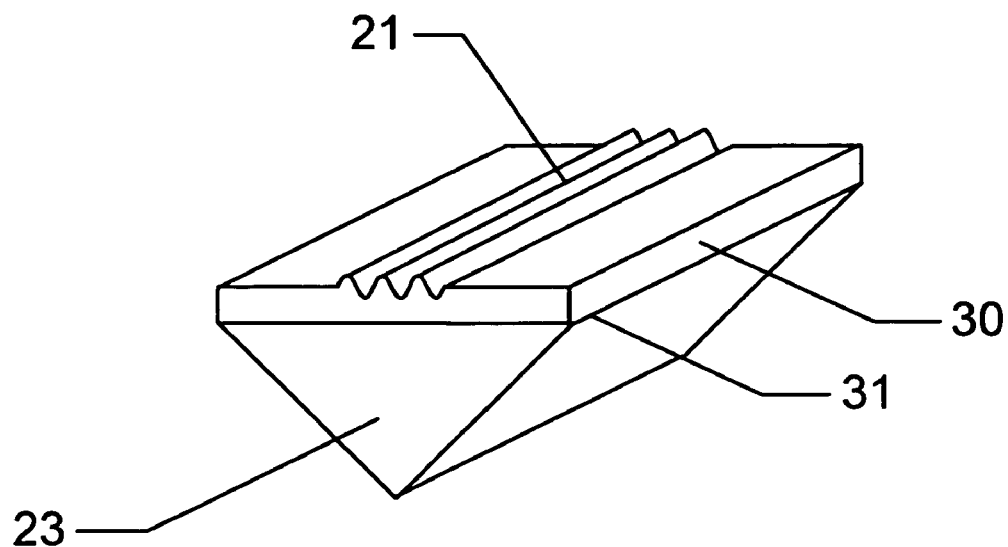
FIG. 5 shows a device similar to that of FIG. 4 but with interchangeable contacting surfaces.
Figure 6:
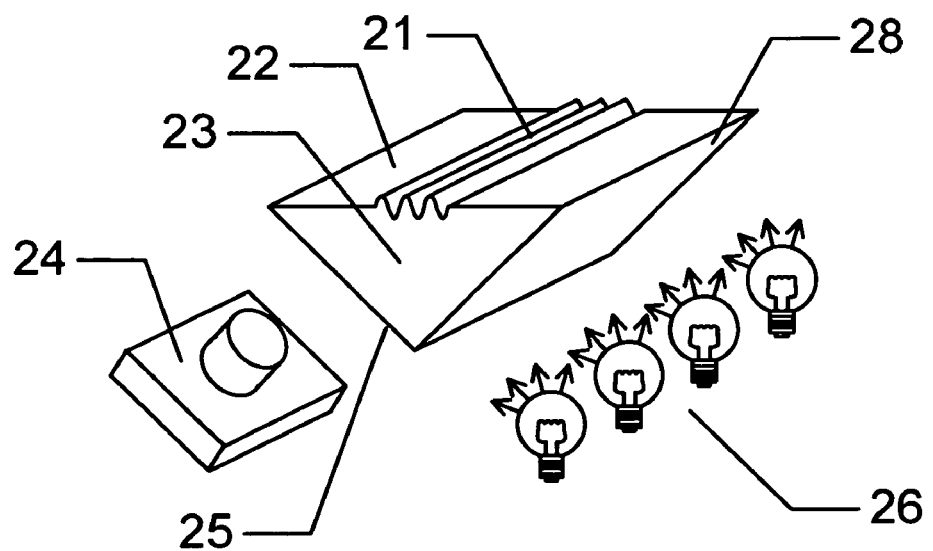
FIG. 6 shows a device similar to that of FIG. 4 but with the diffuser replaced by a plurality of light sources.
Figure 7:
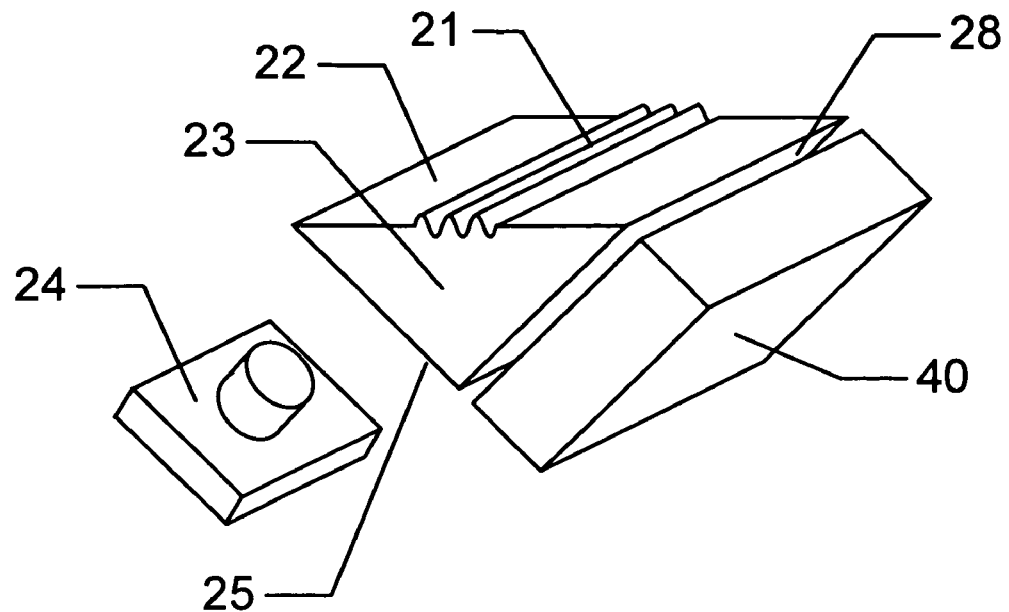
FIG. 7 shows a device similar to that of FIG. 4 but with the diffuser replaced by a light panel.

FIG. 5 shows a prism 23 with a flat hypotenuse face in contact with an interchangeable plate 30 which is shaped as already described. Interstice 31 is filled with a index matching liquid. FIG. 6 shows a similar device without a diffuser, but with a single light source replaced by a collection of light sources. A similar effect could be obtained with an appropriately shaped scialitic mirror or by a plurality of light sources 35 as depicted by FIG. 6. Still a similar effect would be obtained by using a panel light source 40 (LED array or optical fiber bundle) instead of a concentrated light source as shown by FIG. 7.

Figure 8:
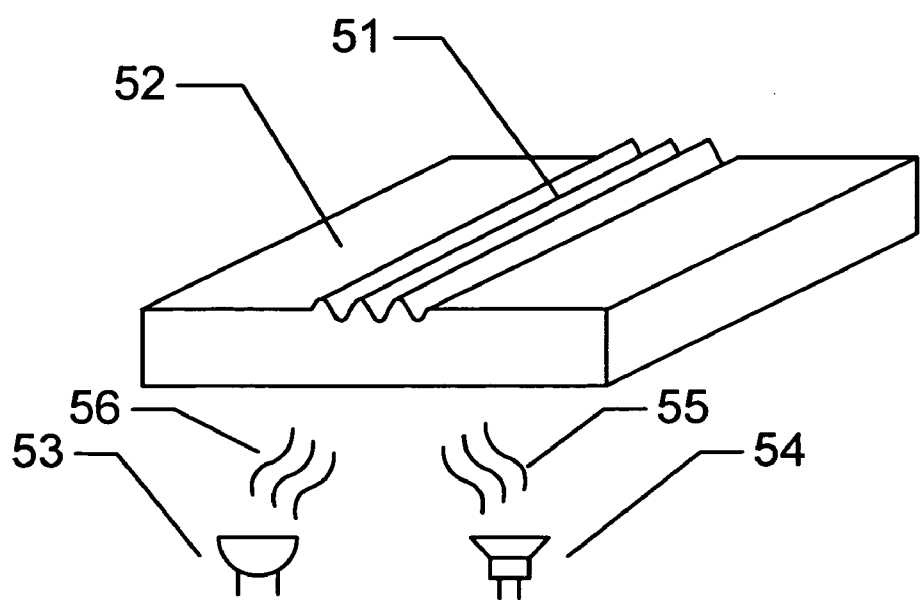
FIG. 8 shows the principle of an ultrasonic device capable of measuring the deformation of the skin of a finger.
Figure 9:
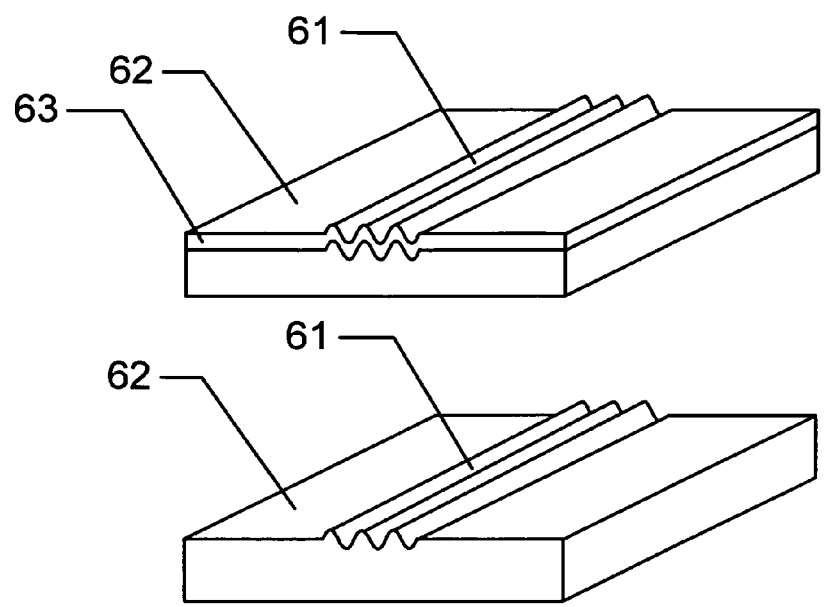
FIG. 9 shows skin deformation measuring devices utilizing capacitive, thermal or electro-optical polymers sensors.

FIG. 8 shows a plate 52 which permits ultrasonic waves 56 emitted by emitter 53 to be transmitted to the exposed side in contact with a finger. Ultrasonic waves 55 are reflected back to receiver 54 as a function of the contact condition between the surface of plate 52 and the finger. This configuration can use a plurality of transmitters and receivers, or alternatively, the transmitter 53 can be associated to a scanning mechanism. FIG. 9 shows yet other configurations able to accomplish similar functions. For example, the imaging mechanism may be of capacitive type where an array 63 of capacitive sensors image the fingerprint created by a finger in contact with surface 62 which can have features 61. Another example of such sensor is provided by thermal imaging sensors.

Figure 10:
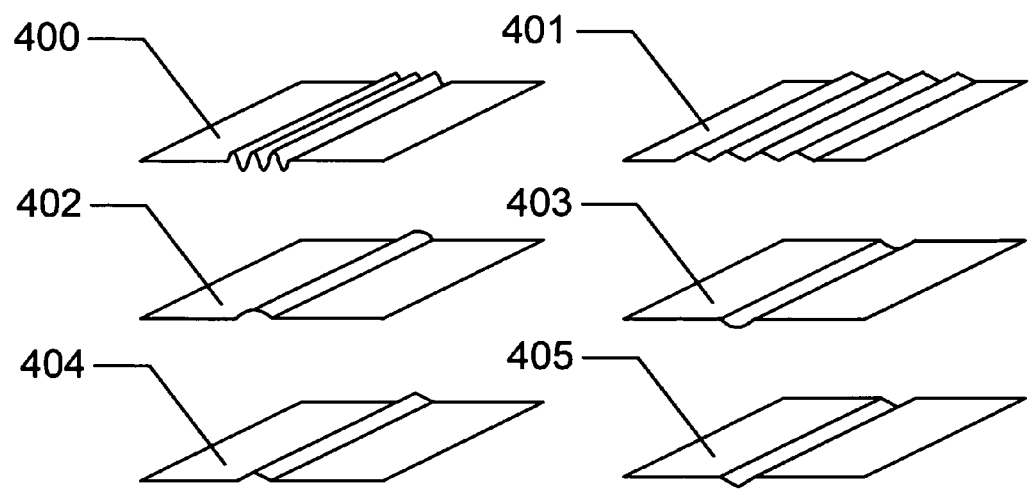
FIG. 10 shows various surfaces which are appropriate for recording via frustrated total internal reflection.
Figure 11:
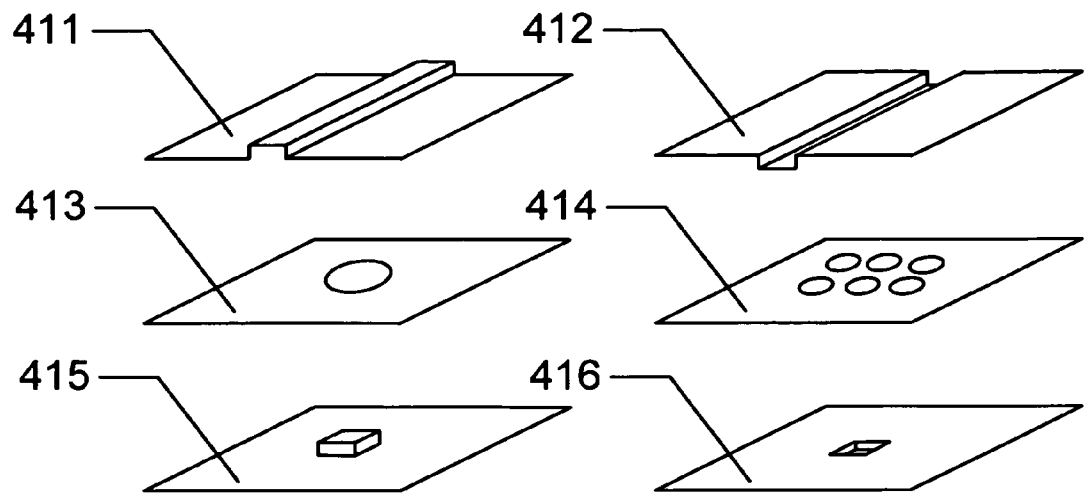
FIG. 11 shows various surfaces which are marginally appropriate for recording via frustrated total internal reflection.

FIG. 10 shows a series of contact surfaces 21, 51, or 61. These surfaces are appropriate for all optical variants of the invention. Surface 400 is shaped with undulating profile, 401 is shaped with saw-tooth profile, surfaces 402 and 404 have a ridge, surface 403 and 405 have a gutter. FIG. 11 shows another series of contact surfaces 51 or 61. These surfaces can be partially appropriate for the optical variants shown previously of the skin deformation measuring device 3 because they would likely create unwanted artifacts. Surfaces 411 and 412 are raised and depressed rectangular profiles. Surfaces 413 and 414 have one or more raised or depressed dots. Surfaces 415 and 416 have a single raised or depressed square.

Having described the manner in which signals indicative of skin deformation may be measured while a finger is in contact with a surface, the manner in which similar deformations may be created by display device 7 at the surface of another finger is now described.

Figure 12:
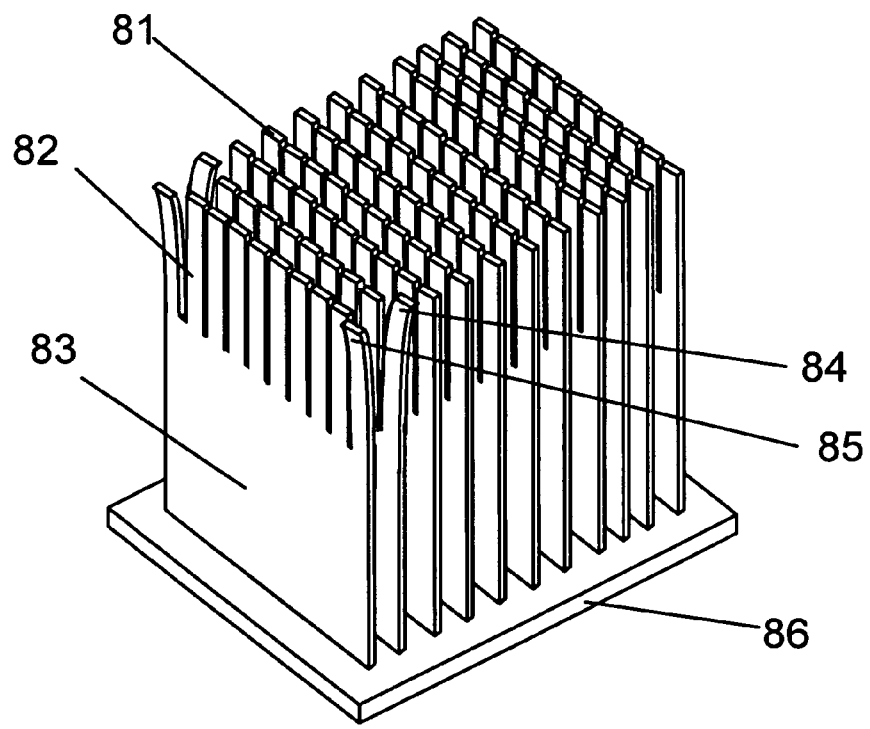
FIG. 12 shows the disposition of a skin deformation inducing device made of stacked comb-like piezoelectric multiple benders.

With reference to FIG. 12, there is provided an array of comb shaped plates 83 which can bend under activation. As it is well known to those skilled in the art, such bending plates may be conveniently realized with piezoelectric material assembled into a bimorph configuration. The embodiments of the invention are not limited to use of these materials. What is important however is that the movements of the teeth 82 of the plates 83 can transfer a deforming force to the skin of a contacting finger without slip between the tips 81 and the skin. Each tooth 82 is activated independently from the others as shown pictorially with tips 84 and 85 which are shown displaced in opposite directions. A grounding structure 86 holds the plates 83 in place such that when not activated they return to a straight resting position. Such disposition has many variants as a function of the number of plates, teeth, sizes, and of they relative disposition.

Figure 13:
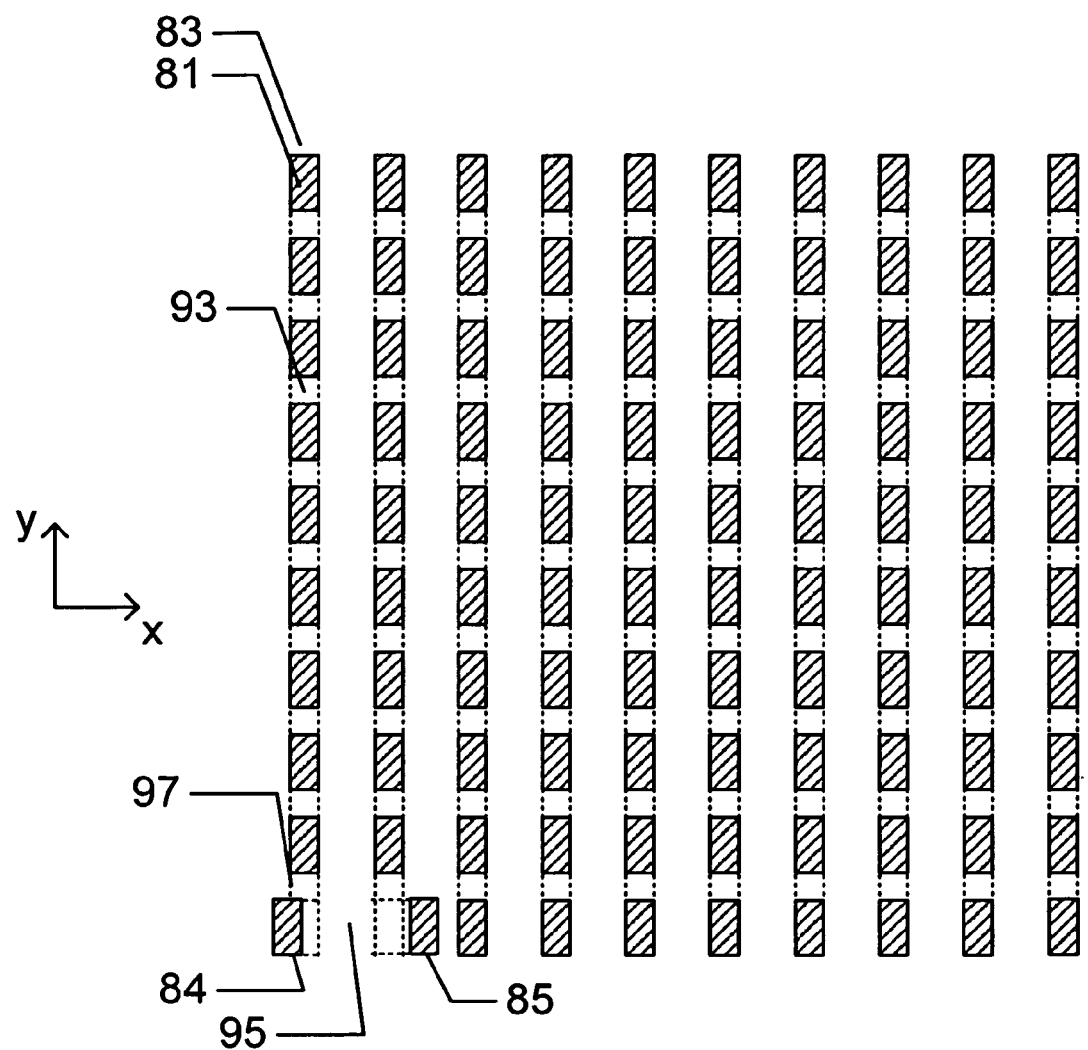
FIG. 13 shows the manner in which the skin deformation inducing device can cause either principal strain or shear strain.

FIG. 13 shows a top view of one preferred example of such disposition of display device 7. Ten piezoelectric bimorph sheets 83 are stacked side by side in the x-direction with constant spacing or not. Each piezoelectric sheet 83 is formed to have a series of tooth-like individual actuators 81 separated by small partial gaps 93 extending from where the actuators meet. A fingertip (not shown) makes contact with most or all of the tooth-like actuators tips. Each tooth-like actuator can be controlled to be displaced either in the negative x-direction or the positive x-direction as shown for tooth-like actuators 84 and 85 respectively. A small piece of the fingertip's skin 95 between or overlying the actuators 84 and 85 is stretched or compressed according to the actuators activation. The relative movement of neighboring tooth-like actuator at gap 93 also causes shearing of the skin as exemplified by gap 97.

Figure 14:
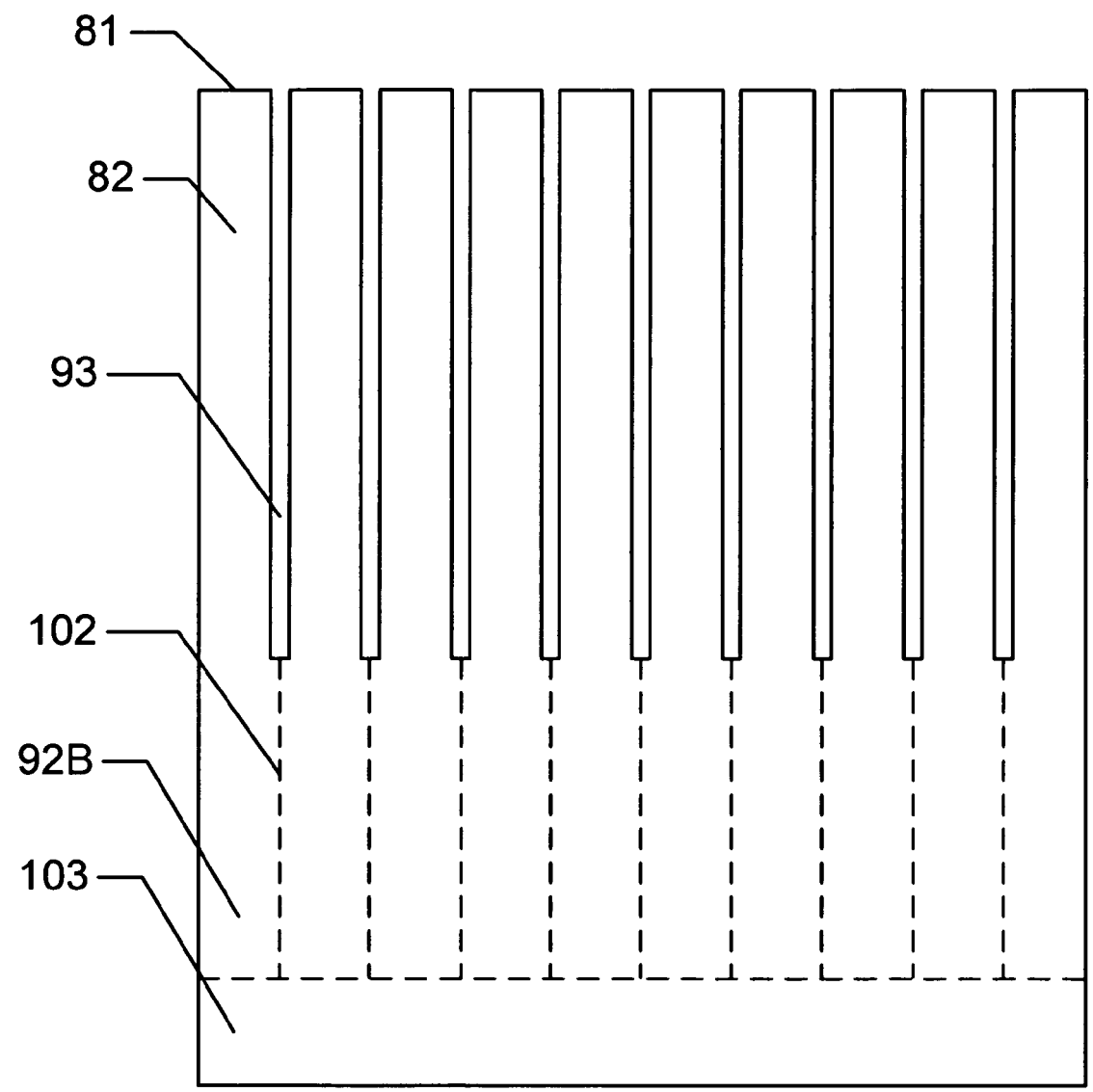
FIG. 14 shows how each comb-like piezoelectric multiple bender may be realized from a single plate.

FIG. 14 shows the manner in which a single sheet of piezoelectric bimorph bending plate can be made to provide several tooth-like actuators 82. A single tooth-like actuator consists of a free moving tip 81 separated by gaps 93. Such bending piezoelectric sheets are provided with electrodes covering their exposed surfaces. Shallow cuts 102 are provided to electrically separate each tooth-like actuator. Alternatively, electrical separations can be obtained by the chemical action of a removal agent, while protecting the areas to be left untouched as in lithographic processes. Another method to provide the same may result from mechanical erosion via sand blasting through a stencil or under the action of a water or air jet containing eroding particles. These separation can also be made by eximer laser erosion. Yet another method to provide for the electrical separations 102 can be by selective deposition of the conductive electrode material on the surfaces through a mask. Areas 92B are thus conveniently provided for individual electrical connections. The tooth-like actuators share a common structural area 103 to provide for structural support.

Figure 15:
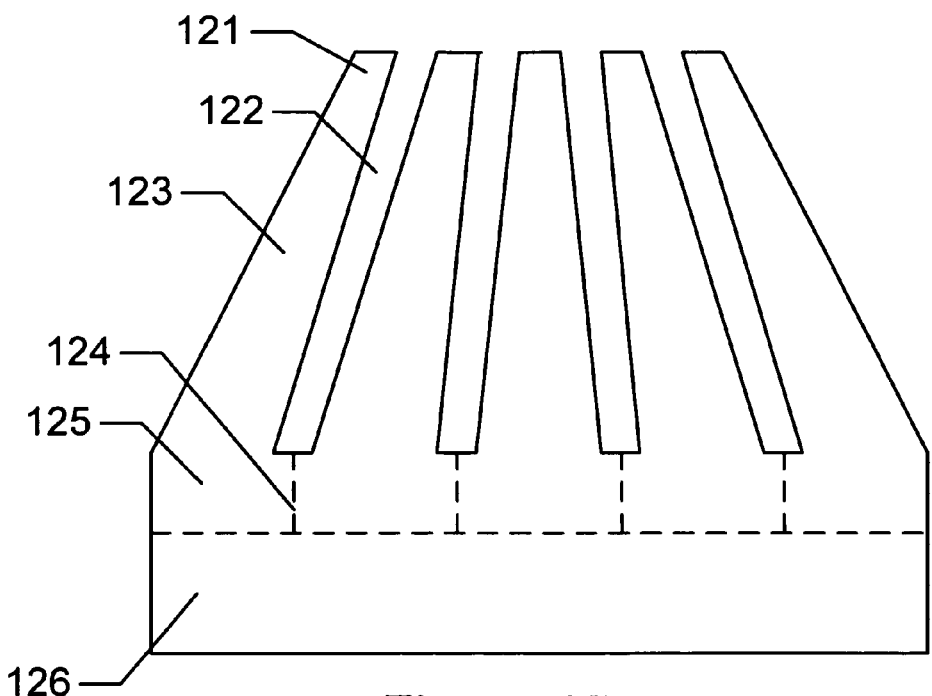
FIG. 15 shows how a comb-like piezoelectric multiple bender may be shaped to increase its strength.
Figure 16:
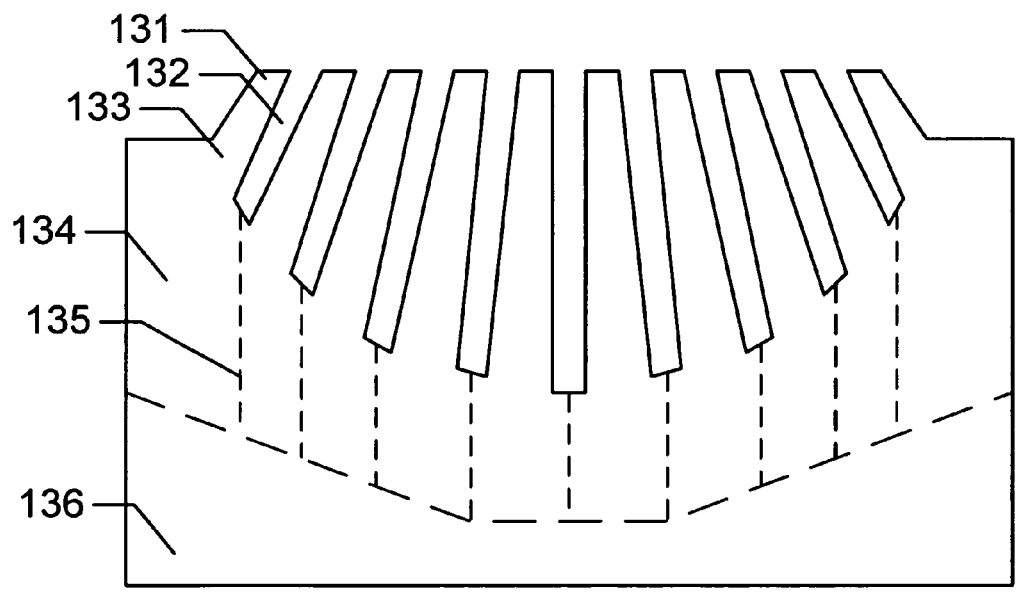
FIG. 16 shows how a comb-like piezoelectric multiple bender may be shaped to vary its response.

FIGS. 15 and 16 describe alternate improved comb shaped plates similar to those shown in FIG. 14. The tooth-like actuators 123 are also mechanically made independent by gaps 122 in between each. They are similarly electrically isolated at the base 125 by shallow cuts 124 and can be manufactured using similar processes. In this case however, the tooth-like actuators are wider at the base 125 than at the free end 121. Area 126 similarly serves as a common structural bed which is not electrically conductive. Moreover, the angled tooth-like actuators 123 converge towards the tip 121. This arrangement combines an increased spatial resolution with a stronger structural configuration because the actuators bases 125 are wider than the tips 121 to compensate for the increase of the bending moment due to the cantilever action. FIG. 16 shows yet another variant with the actuators free moving tips 131 aligned but with actuators 133 of different sizes. Yet another variant (not shown) provides tips aligned along a curve to accommodate the general shape of a finger cross-section.

Figure 17:
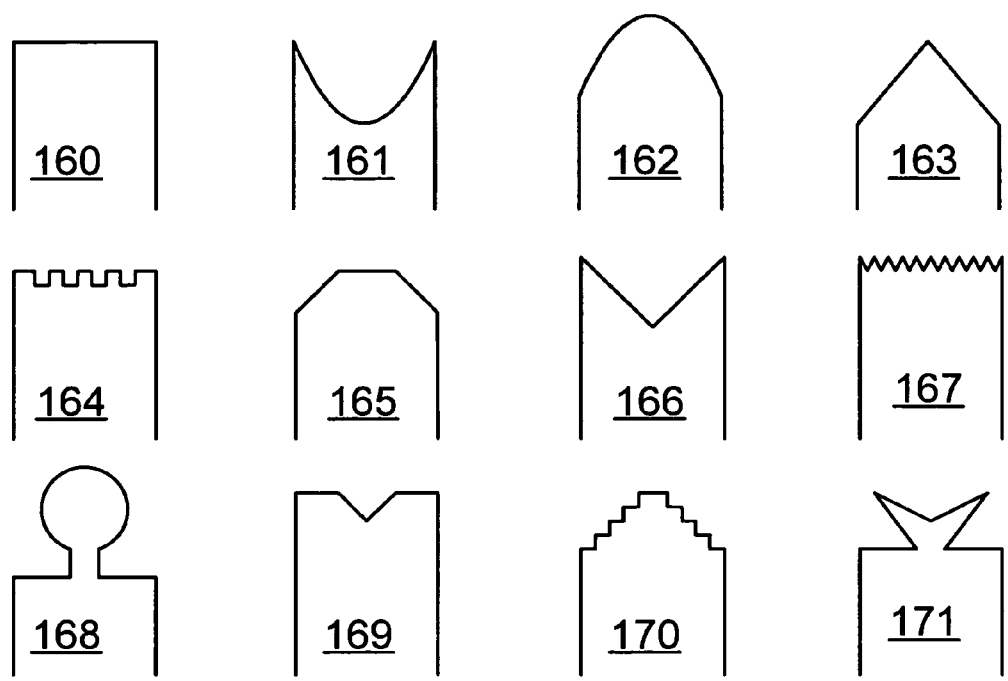
FIG. 17 shows various shapes of skin contactors.
Figure 18:
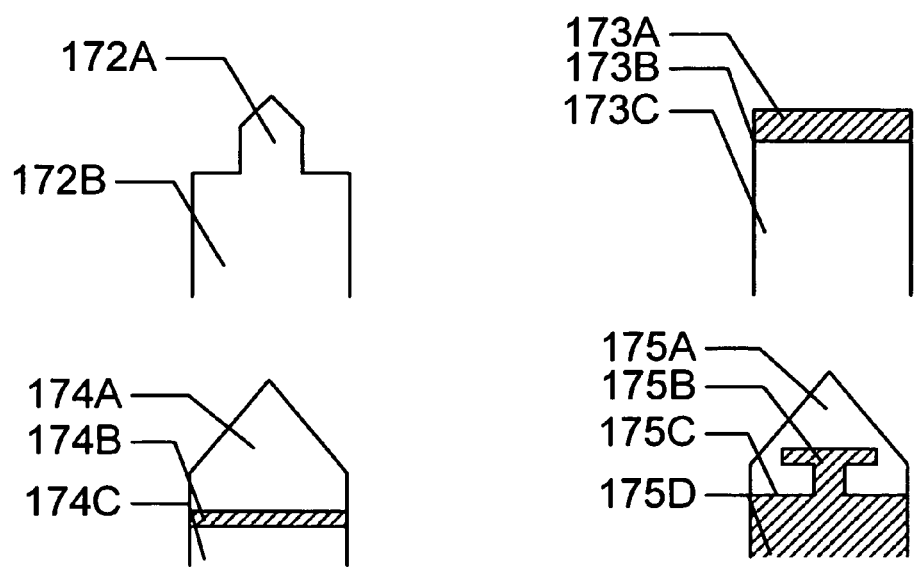
FIG. 18 shows skin contactors separate from the benders themselves.

FIG. 17 shows variants of the shapes of the skin engaging tip end to improve the grip of the finger contacting tips. Of particular interest are variants 164 and 167 designed to provide increased traction on the skin while minimizing tactile sensation when not activated. Such variants are useful to improve the tactile contrast from the rest to activated state of the contactors. FIG. 18 show yet other variants where the contacting tips are attached via bonding or interlocking to actuator upper surface.

Figure 19:
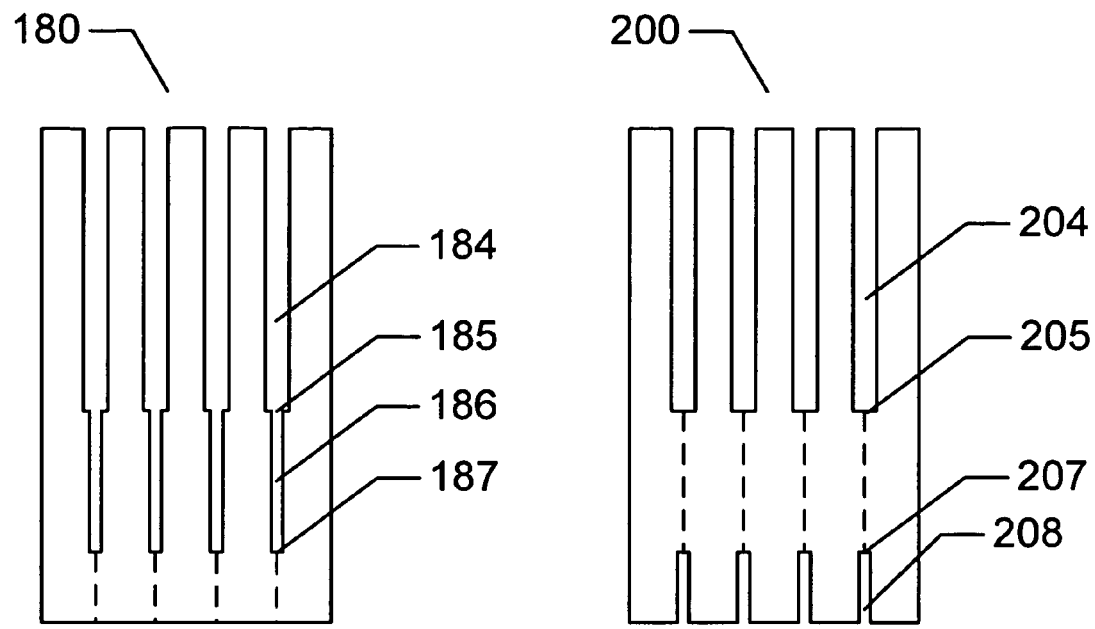
FIG. 19 shows how comb-like piezoelectric multiple bender can be shaped to be interlocked for form a grid.
Figure 20:
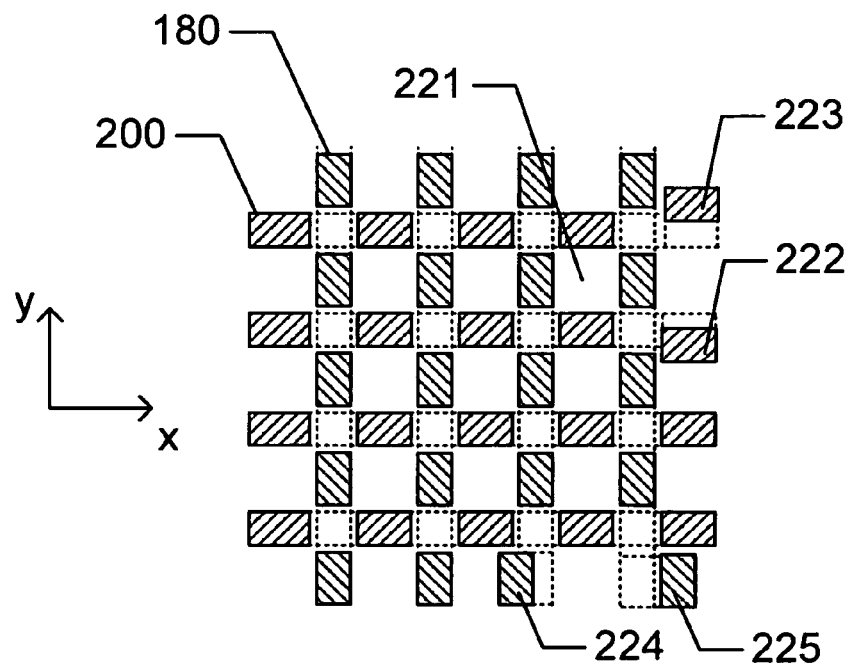
FIG. 20 shows a grid of interlocked comb-like piezoelectric multiple benders

FIG. 19 shows alternate configurations of plates 180 and 200 to permit plates to be interlocked at right angles (or other angles) to form an array of contacting tips moving in different directions. By way of example, four sheets of type 180 can be interlocked with four sheets of type 200 such that slots 208 and 186 have the widths 187 and 207 slightly larger than the thickness of the plates. The spacing of the teeth 184 and 204 9is larger than the thickness of the plate to permit movement of the actuators. This configuration permits the movement of actuators along both axes and improves the rigidity of the assembly. A top view of the array is shown in FIG. 20. The actuators of sheets 180 move in the x-axis as illustrated by displaced tip 224 (negative x direction) and by displaced tip 225 (positive x direction). Similarly, the actuators of sheets 200 move in the y-axis as illustrated by displaced tip 222 (negative y direction) and by displaced tip 223 (positive y direction). An element of skin 221 can thus be compressed or expanded along both axes.

Figure 21:
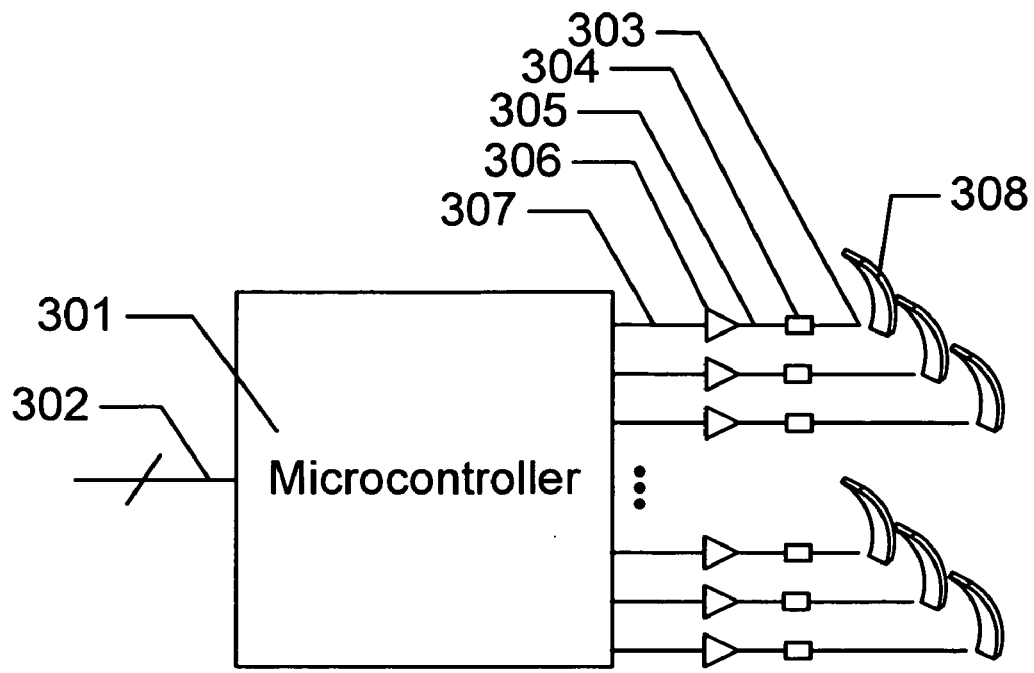
FIG. 21 shows digital circuitry to drive a large number of actuators.

FIG. 21 shows the manner in which control signals may be produced for such numerous individual actuators. Control signals 302 are received serially or in parallel by a microcontroller 301 which may consist of an Application Specific Integrated Circuit (ASIC) or a Field Programmable Gate Array (FPGA) or other digital circuitry. Pulsed signals 307 are sent from circuit 301 to each actuator. This signal is amplified by amplifying circuit 306 to the appropriate voltages required by the actuators. The amplified pulsed signals 305 are then filtered by a filtering module 304, resulting in an continuously controlled voltage 303. The voltage is applied to actuator 308 via connection 303, causing it to move to an appropriate position. The filtering module 304 may consist in part or in whole of the piezoelectric actuator 308 itself.

Figure 22:
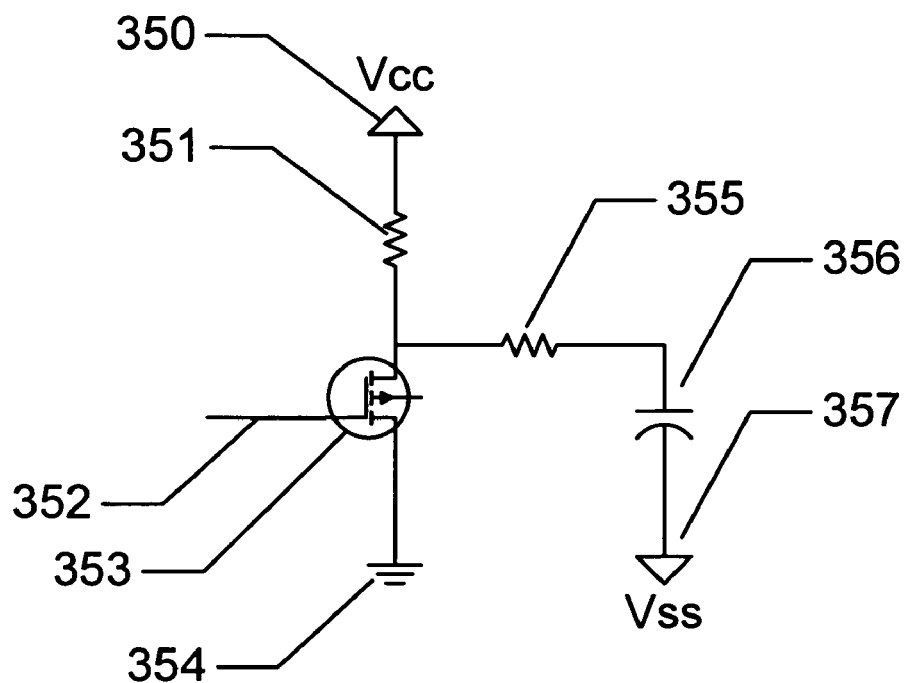
FIG. 22 shows a modulation amplifying circuit utilizing only one transistor.
Figure 23:
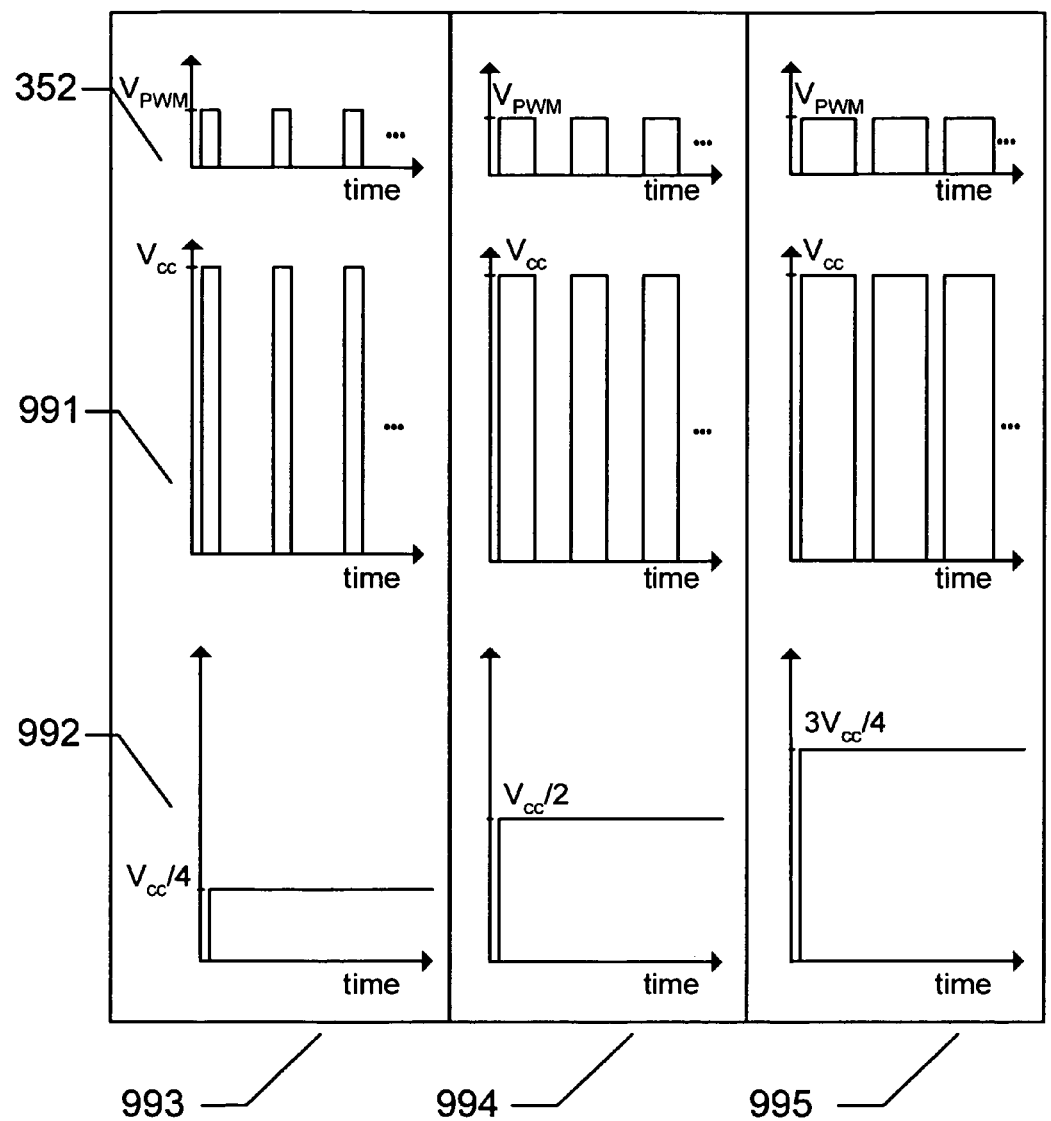
FIG. 23 represents diagrammatically the effect of modulating the duty cycle of the driving pulsing signal.

While the use of pulsed signals to provide efficiently for the production of continuous signals is well known, there is provided a circuit which is capable of amplification using just one single transistor and two resistors. In applications where amplifier circuits are needed in large amounts, the complexity and hence of the cost of the complete application grows with the number of such circuits. Hence there is the general need to provide for amplifying circuits of minimal complexity. Referring to FIG. 22, a low voltage control digital signal 352 (such as CMOS or TTL logic) is sent to a fast switching MOSFET transistor amplifier 353 in the form of pulses (which can be used in the form of pulse width modulation PWM or other forms of modulation such as sigma-delta modulation). The signal is amplified by the combination of the resistive elements 351 and 355 and the voltage source 350. The source 350 is set to a DC voltage Vcc which substantially corresponds to twice the maximum voltage required by the actuators. It is known that that piezoelectric material is capacitive. Piezoelectric actuator 356 is used as an energy storage element to filter the pulsed signal without the need for additional components. Another voltage source 357 is set to a DC offset voltage Vss that substantially corresponds to the maximum voltage required by the actuators. This voltage source 357 offsets the voltage across the capacitive element 356 so that both negative and positive potentials can be set across the piezoelectric actuator, resulting in a bipolar amplifier. By way of example, FIG. 23 illustrates pulse width modulated signals 352 sent to the circuit of FIG. 22 and shows the resulting voltages at the positive electrode of the piezoelectric actuator 356. A signal 352 is amplified to a signal 991 and then filtered by the piezoelectric actuator 356, resulting in a voltage 992 at the positive end of the actuator. Examples with duty cycles of 25%, 50% and 75% are shown respectively in 993, 994 and 995.

Figure 24:
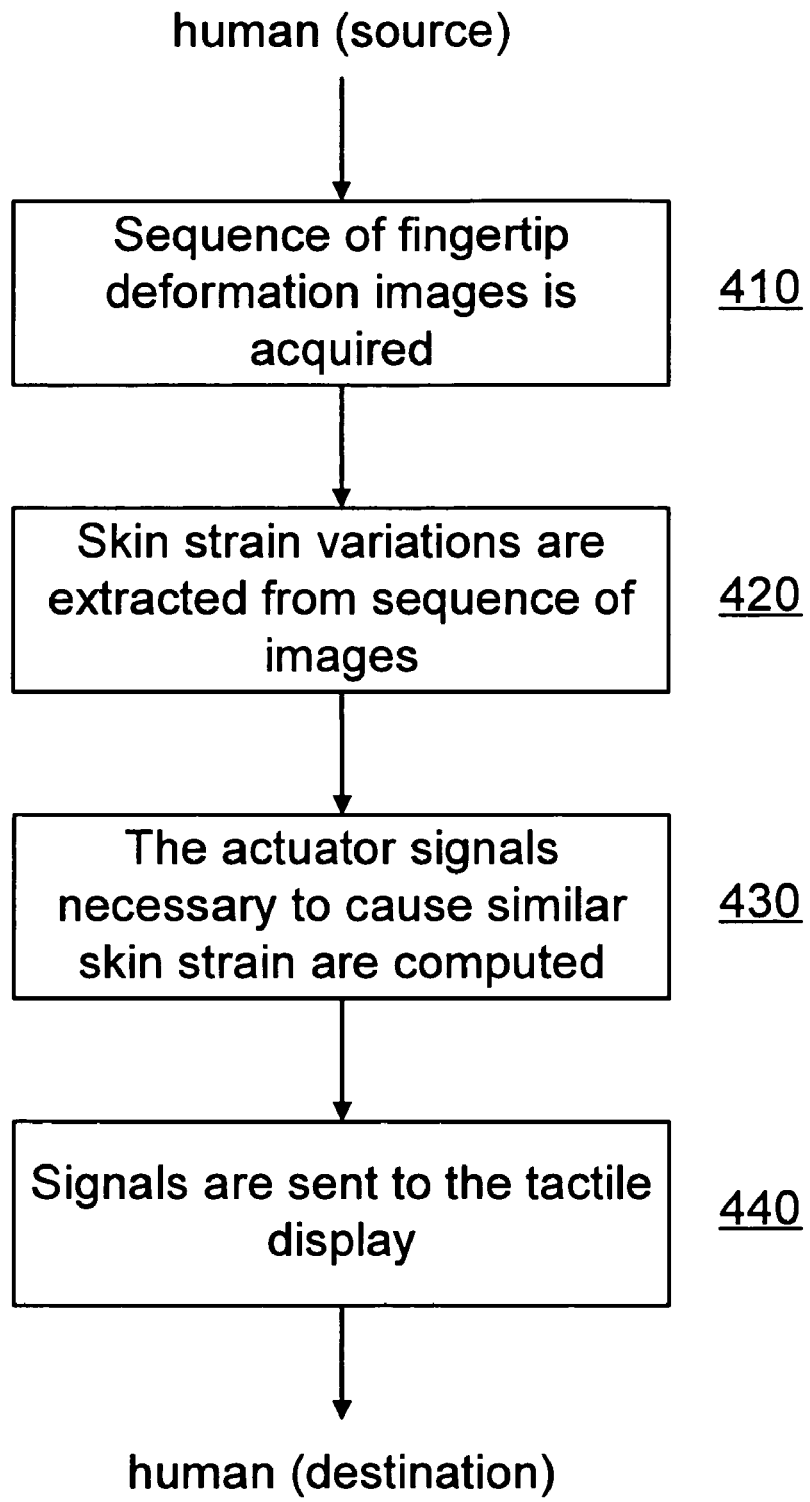
FIG. 24 shows the steps needed to convert signals indicative of skin deformation to signals appropriate for driving a tactile display.

Having described the manner in which tactile signals may be displayed by device 7, now is described with the aid of FIG. 24 the manner in which unit 5 may convert signals obtained from a skin deformation measuring device 3 to a skin deformation causing device 7.

The unit 3 acquires images of a moving fingerprint in contact with surfaces for subsequent extraction of anatomical or other types of landmarks. The extracted features are then tracked and processed, yielding a stream of relative local skin strain variations over time. Fingerprint analysis generally relies on two types of features of the fingerprint called minutiae: ridge endings and ridge bifurcations (Jain and Pankanti, 2001). Roddy and Stosz (1999) proposed the use of pores to increase matching accuracy. Pores are small openings on the surface of the fingerprint ridges with a density of approximately 5 per mm.

FIG. 24 shows how device such as unit 3 produces at step 410 sequences of images indicative of skin deformation while contacting the surface of an object. Step 420 extracts from these images skin strain variations estimated by comparing successive images which may be obtained by observing the relative movements of characteristic features of the images. These features may be naturally occurring as a result of friction ridges patterns or may be artificially created. Typical naturally occurring features include valley bifurcations, valley endings, and pores. Features may also be created artificially using ink, fluorescent dyes and other marking materials applied in a pattern using marking tips or by spraying fluids through a stencil. Such tracking will be further described below. At step 430 the skin strain changes are converted to actuator signals appropriate to create an approximation of the original deformation. Finally, the actuator signal are sent at step 440 to device 7 in order to drive each individual actuator.

Figure 25:
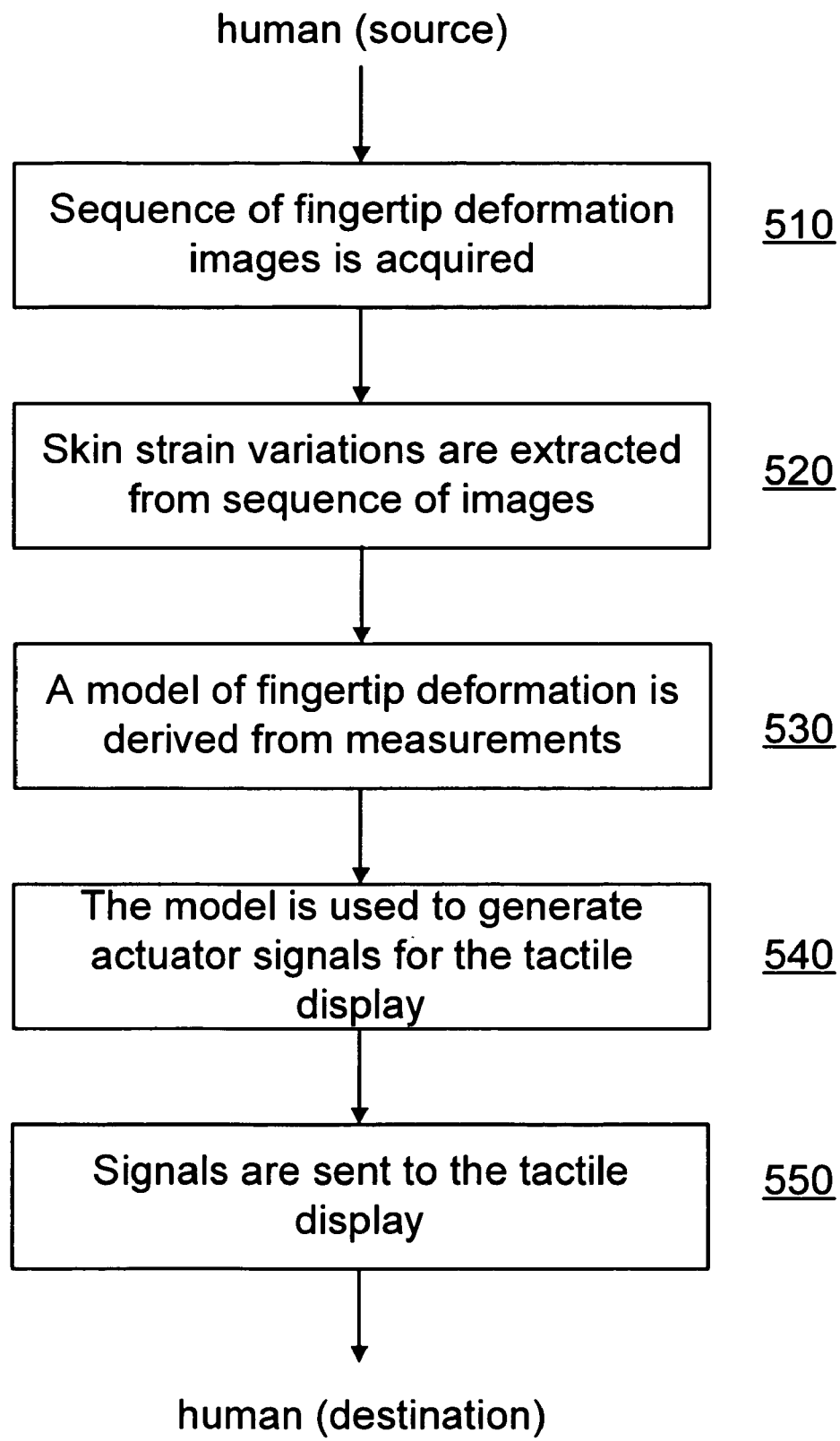
FIG. 25 shows an alternate sequence of steps needed to convert signals indicative of skin deformation to signals appropriate for driving a tactile display.

FIG. 25 shows another method for producing individual actuator signals from images of a deforming fingerprint. Step 510 and 520 are substantially similar to steps 410 and 420, however the movements of the features are used to constrain the predictions of a model of finger tip skin deformation at step 530. Many such models are possible. One model which is well know by those skilled in the art may consists of a collection of nodes connected to each other by linear or nonlinear elastic elements thus forming a mesh. With the use of such model it is possible to predict the movements of all nodes from the knowledge of the movement of a subset of them by computing the relaxed state of the complete mesh. More complete models may also include the representation of friction forces for more accurate predictions. At step 540, the skin strain changes predicted by the model are converted to actuator signals appropriate to create an approximation of the original deformation. Finally, the actuator signal are sent at step 550 to device 7 in order to drive each individual actuator.

Fingerprint movies can optionally be first smoothed with a filter to reduce noise. The local average in a square window of a given width (approx. 2 mm) is then computed for each pixel. A high local average and a low local variance are then used as an indicator of background pixels (Mehtre and Chatterjee 1989). A binarization operation then uses the local average map as a pixel-wise threshold on the foreground image to segment valley and pore pixels (white) from ridge pixels (black).

Pores appear as round features with a diameter varying between 88 and 220 mm and can thus be detected from the binary fingerprint by connected-component (or 'blob') analysis. A blob—defined as a set of white pixels in which every pixel is 4-connected to at least one other pixel—is considered to be a pore if its area is smaller than 0.2 mm. The position of a pore is determined by computing its center of mass using grayscale intensity values from the foreground image.

Next, a thinning operation reduces the remaining valley pattern to a width of 1-pixel while maintaining its topology. The number of 8-neighbors of skeleton pixels is then used to determine their classification. The orientation of nearby valleys is used to obtain distinguishing minutia characteristics. Pores do not have distinguishing features.

Figure 26:
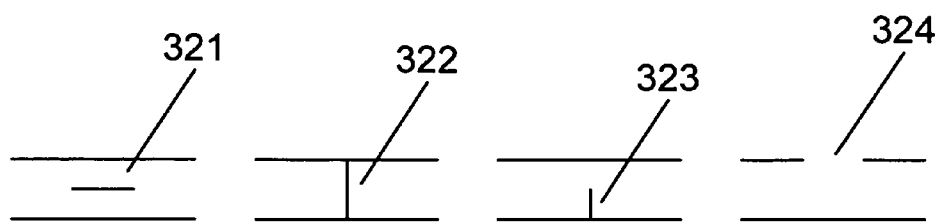
FIG. 26 shows corrections automatically made to features detected in fingerprint images.
Figure 27:
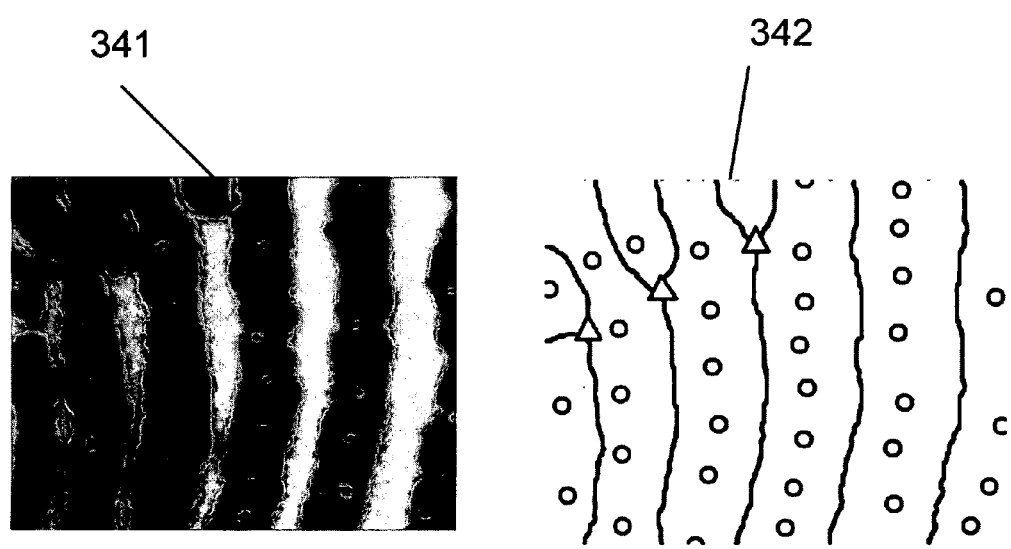
FIG. 27 show a grey level fingerprint image which is processed to extract features.

The feature extraction process often results in fingerprint skeleton artifacts. Syntactic editing rules adapted from Roddy and Stosz (1999) are applied to eliminate the four common defects shown in FIG. 26. Short valleys 321, bridges 322 and spurs 323 are replaced by pores. Broken valleys 324 are bridged. Two additional filtering operations are applied to reject unreliable features. The first operation discards features in regions of high feature density. The second operation rejects features near the outer border of the fingerprint. FIG. 27 shows how a grey level image 341 is processed into a simplified version 342 where the valleys and hence the valley bifurcations (triangles), and the pores (circles) are identified.

Next, skin strain measurement consists of three steps. The first step matches features in pairs of consecutive frames. The second step assembles matches into smooth and reliable feature trajectories. The third step infers changes in skin strain from the relative changes in edge length in a triangulation of tracked features. Feature matching from frame to frame relies on the assumption that the image acquisition rate is sufficiently high to ensure that feature displacements are much shorter than inter-feature distances. For each pair of frames, an attempt is made to match as many features as possible from the first frame to the second. Matching is performed by searching for the best match near a feature's expected position as predicted from its previous displacement, if available. Any feature of the same type (valley ending, valley bifurcation or pore) within a given radius (approx. 0.3 mm) is considered a candidate match and given a confidence rating that decreases with the distance from the feature's expected position and with the minutia orientation error, if applicable. Matches are selected so as to maximizes the sum of confidence ratings without matching the same feature twice.

Fingerprint feature extraction algorithms are not sufficiently reliable to insure the stability of features. As a result, the matching algorithm is generally capable of tracking features continuously only for a number of frames. The result is a set of disjoint feature trajectories starting and ending at different frames. To improve the quality of measurements, features trajectories that do not span a minimal number of frames (approx. 30) are assumed to be unreliable and rejected. The discrete nature of the image grid as well as minor feature extraction errors also result in jagged feature trajectories. This is corrected by smoothing trajectories, resulting in subpixel feature coordinates.

Figure 28:
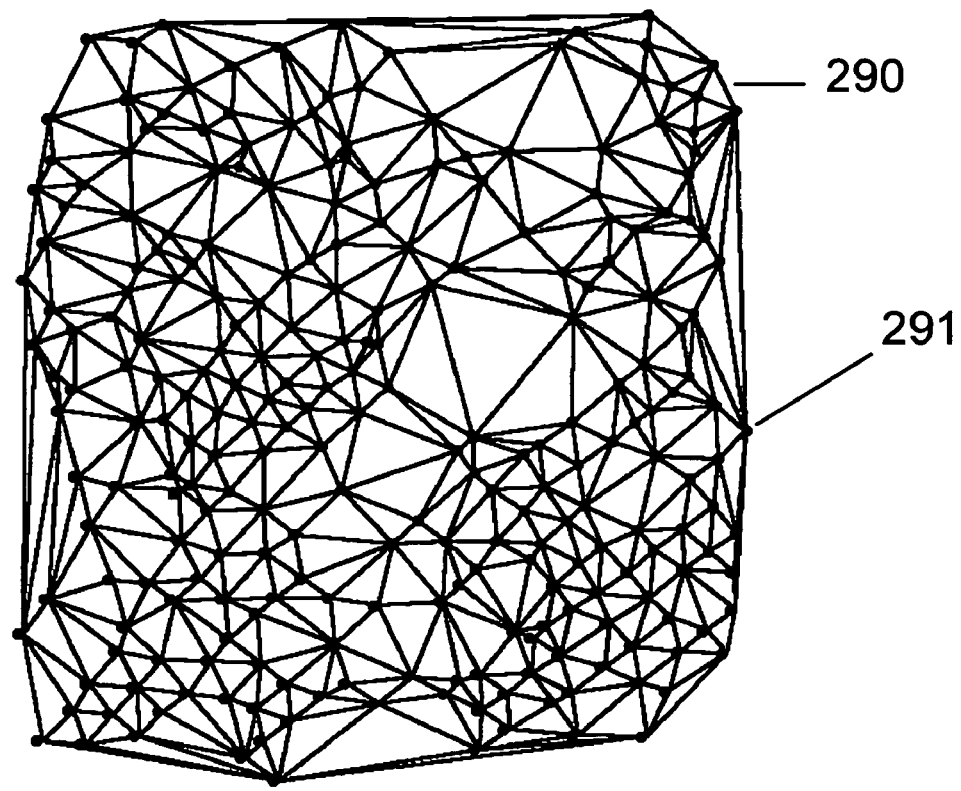
FIG. 28 show a triangulation of detected features to be tracked over time.
Figure 29:
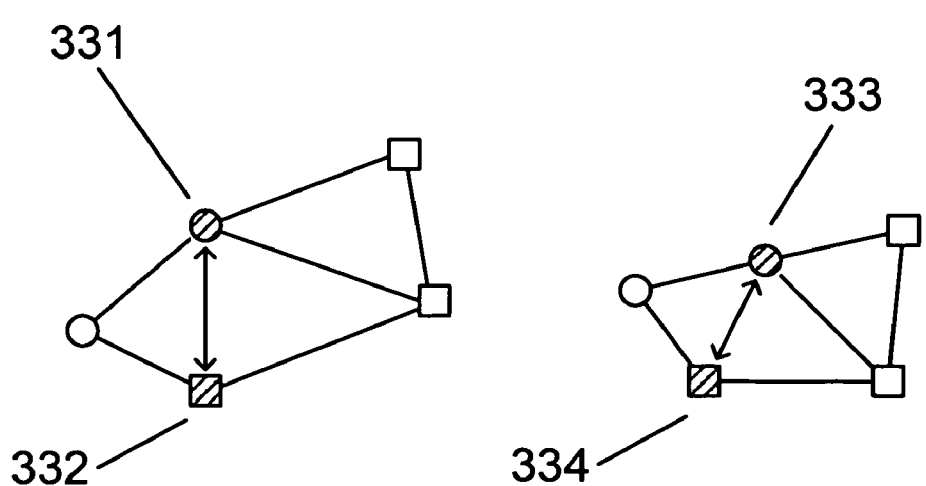
FIG. 29 illustrates the process of tracking features over time to detect deformation.
Figure 30:
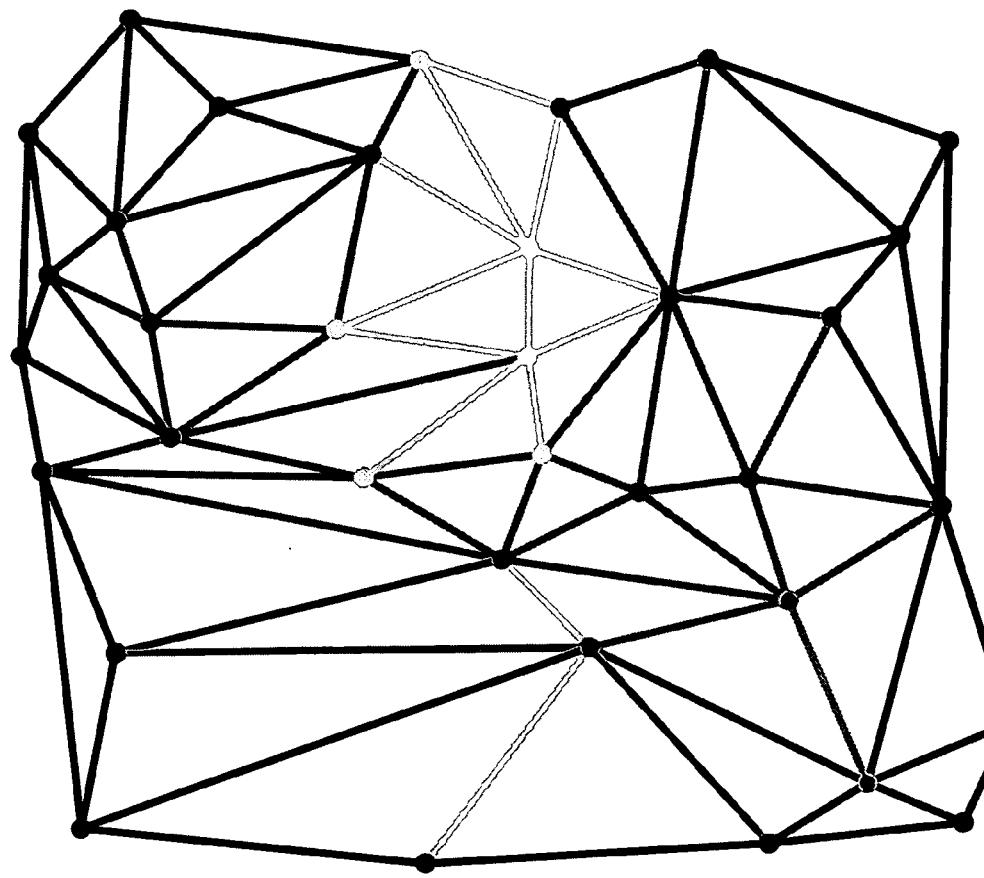
FIG. 30 exemplifies the deformation of one's finger pad skin when touching an object.

Changes in local skin strain are estimated by observing changes in a triangulation of tracked features. The subset of features of a frame that are tracked in the subsequent frame is used to construct a Delaunay triangulation as exemplified by FIG. 28 with nodes 291 and edges 290. The change in local skin strain is evaluated by measuring the change of edge lengths as illustrated in FIG. 29 where feature 331 is matched to the same relocated feature 333 and feature 332 is matched to the same relocated feature 334. Each pair of successive images is analyzed, yielding a map of relative changes in skin strain over time. For purposes of illustration, skin strain measurements can be represented by variations in the grayscale intensity of edges from black (maximum relative decrease in length) to white (maximum relative increase) as shown by FIG. 30. Measurements can also be made over a span of more than one frame.

Figure 31:
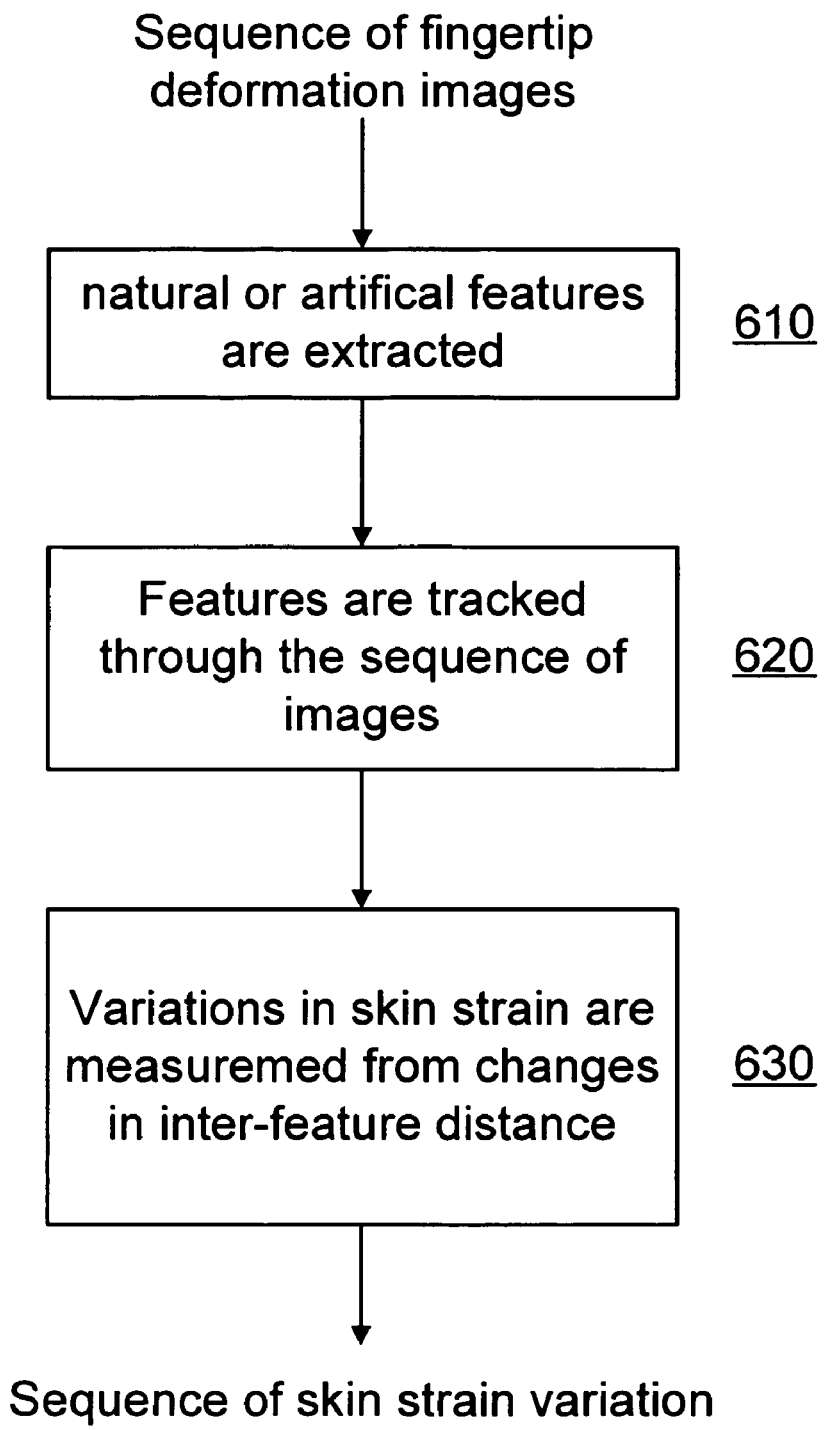
FIG. 31 shows a detailed sequence of steps to measure skin deformation.
Figure 32:
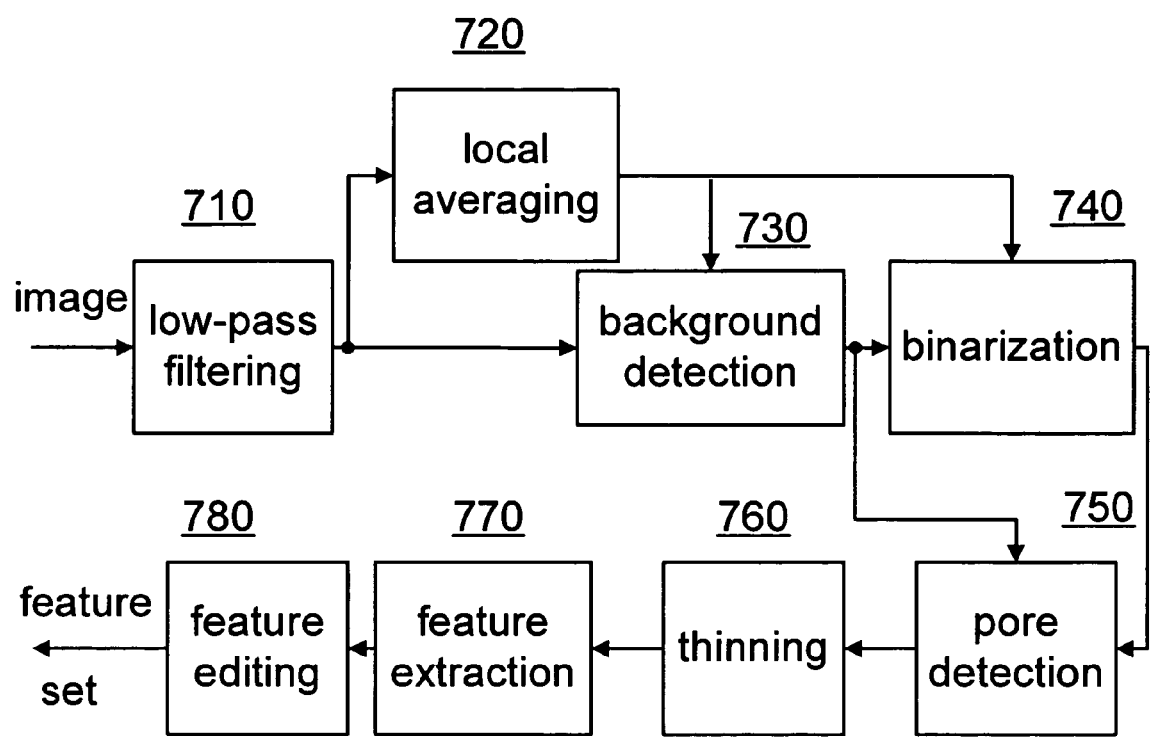
FIG. 32 shows a detailed sequence of steps needed to extract features from an image of a fingerprint.
Figure 33:
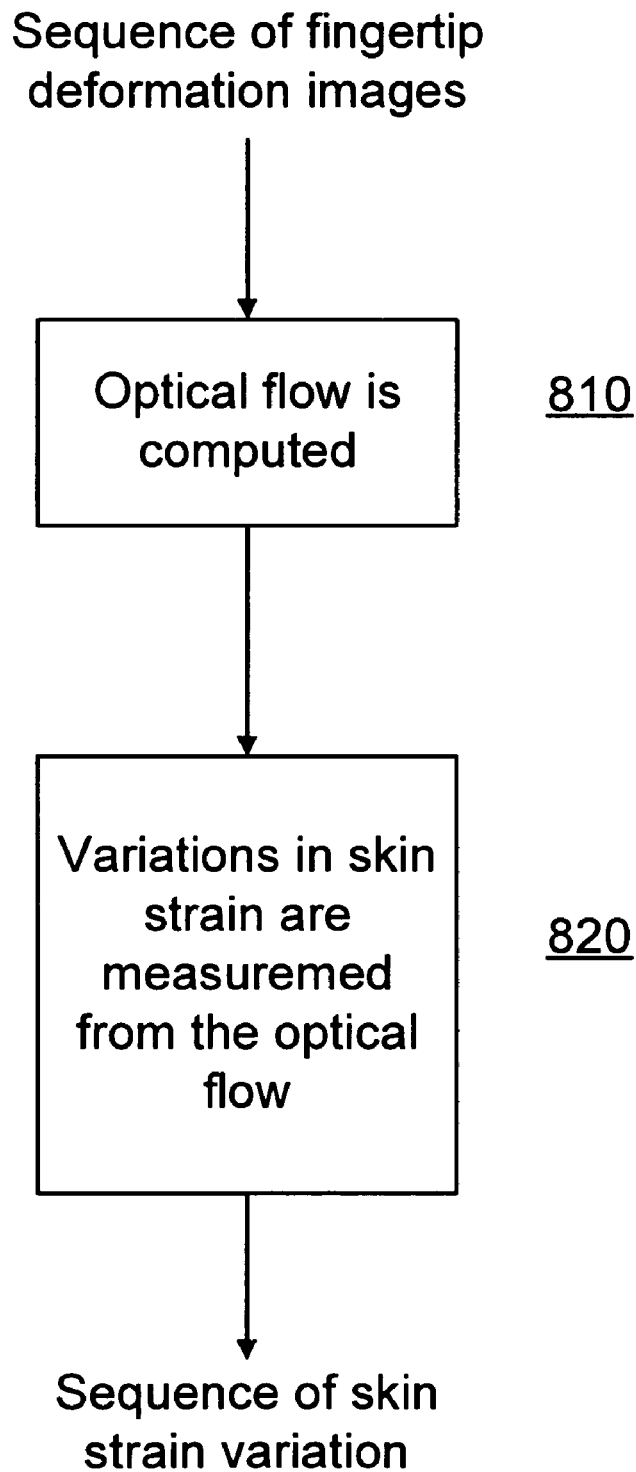
FIG. 33 shows an alternate sequence of steps to measure skin deformation.

Having described the processing steps in their broad outlines, additional details are now are provided with the help of FIGS. 31, 32, and 33.

FIG. 31 summarizes a preferred method to accomplish step 420 or 520. At step 610 natural or artificial features are extracted from an image. At step 620 each of these features is tracked from frame to frame into long sequences. A criterion for deciding that a same feature appears from one frame to the next may be based on the observation that the speed of skin sliding on a surface is bounded and hence that a given feature will appear in the next frame within a radius smaller than the minimum distance between two features of the same fingerprint. At step 630 the variations in distances between each features is recorded. This may be accomplished by determining a triangulation between these features. For example, a Delaunay triangulation may be conveniently used. Then sequences of skin strain variation can be computed by determining the area of each triangle or by determining the lengths of their edges.

FIG. 32 show in greater details steps which mat be taken to accomplish step 610. At step 710 a process of low pass filtering is used to reduce the noise in the image. At step 720, the intensity of pixels in small windows is average to determine an average grey level. This information is used to compensated for the imperfections of the sensor, be it optical, thermal, or ultrasonic. At step 730, the background image is removed from further consideration. This may be conveniently accomplished by discarding all pixels whose intensity deviate significantly from the average found at step 720. At step 740, the image is simplified by marking the pixels which can reliably be considered to arise from contact and discarding the others. At step 750 features arising from the presence of pores may be extracted on the basis of their morphology. A pore for example will correspond to a set of connected pixels in a small radius. At step 760 thinning is employed to simplify the image even further. This is accomplished by repeated deletion of connected pixels as is well know. At step 770, other features such as valley endings and bifurcations may be conveniently detected. Finally at step 780, errors made during the entire process may be corrected on the basis of prior knowledge of the morphology of fingerprints.

FIG. 33 show an alternate method to accomplish the computation needed to needed to accomplish steps 420 or 520. As it is known from those skilled in the art that sequences of images may be processed directly to compute a vector field know as the image flow by using the intensity differences of each pixel from one frame to the next. These vectors may be used as indication of skin relative deformation at each location of the image.

The unit 5 may be implemented as one or several programs running in a computer (not shown), such computer having one or several arithmetic and logic units (ALU) and having a memory which stores program instructions for the operation of the ALU. The program instructions could be stored on a medium which is fixed, tangible and readable directly by the processor, (e.g., removable diskette, CD- ROM, ROM, or fixed disk), or the program instructions could be stored remotely but transmittable to the unit 5 via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should also appreciate that the program instructions stored in the code memory can be compiled from a high level program written in a number of programming languages for use with many computer architectures or operating systems. For example, the high level program may be written in assembly language, while other versions may be written in a procedural programming language (e.g., "C") or an object oriented programming language (e.g., "C+'" or "JAVA").

Those skilled in the art should further appreciate that in some embodiments of the invention, the functionality of the processing unit 5 may be implemented as pre-programmed hardware or firmware elements (e.g., application specific integrated circuits (ASICs), Field Programmable Gate Array (FPGA), electrically erasable programmable read-only memories (EEPROMs), etc.), or other related components.

While specific embodiments of the present invention have been described and illustrated, it will be apparent to those skilled in the art that numerous modifications and variations can be made without departing from the scope of the invention as defined in the appended claims.

REFERENCES

K. Dandekar and M. A. Srinivasan. Role of Mechanics in Tactile Sensing of Shape. Touch Lab Report 2, RLE TR-604, MIT, Cambridge, 1997.

A. Jain and S. Pankanti. Automated fingerprint identification and imaging systems. In H. C. Lee and R. E. Gaensslen, editors, Advances in Fingerprint Technology. Elsevier, New York, second edition, 2001.

R. Roddy and J. D. Stosz. Fingerprint feature processing techniques and poroscopy. In L. C. Jain, U. Halici, I. Hayashi, and S. B. Lee, editors, Intelligent Biometric Techniques in Fingerprint and Face Recognition. CRC Press, Boca Raton, 1999.

B. M. Mehtre and B. Chatterjee. Segmentation of fingerprint images—a composite method. Pattern Recognition, 22(4):381–385, 1989.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

THE EMBODIMENT OF THE INVENTION IN WHICH AN EXCLUSIVE PROPERTY OR PRIVILEGE IS CLAIMED ARE DEFINED AS FOLLOWS:

1. An area tactile stimulation display device, or "area tactile display device", comprising a plurality of individual, unitary, tactile stimulation display devices,
    each of said individual tactile stimulation display devices having a common base support and a plurality of individually actuatable, bendable, cantilevered arms mounted in line on said base support wherein:
    a) each of said arms has skin engaging tip ends directed away from the base support for effecting tactile stimulation of a skin surface contacting such tip ends through deformation of the skin surface, and
    b) the tip ends on each of said arms are independently displaceable, upon actuation, laterally to the line of said arms to positions that are out of alignment with the line of arms,
    whereby said ends, upon displacement from their initial positions in the line of said arms, transfer a deforming force to skin surface contacted by such tip ends, tending to deform skin so contacted in a direction parallel to the skin surface and transversely to the line of arms
    wherein said individual tactile stimulation display devices are arranged in first and second sub-arrays wherein respective member devices of the first and second sub-arrays are positioned to intersect with each other.

2. An area tactile display device as in claim 1 wherein said respective member devices of said first and second sub-arrays intersect with each other orthogonally.

3. An area tactile display device as in claim 1 comprising primary gaps respectively separating each of the cantilevered arms from neighboring cantilevered arms, such primary gaps extending from the position where such arms meet with the base to the respective tip ends of each of said arms, the second sub-arrays including a second set of secondary gaps extending partially through the base of each transducer device in the second sub-array, such secondary gaps being in line with the primary gaps of each transducer device in the second sub-array, whereby the first and second sub-arrays may be positioned to intersect with each other by inserting members of the second sub-arrays within the primary gaps of the first sub-array, with the secondary gaps embracing respective portions of the common base support of the first sub-array.

4. An area tactile display device as in claim 3 wherein the individual tactile stimulation display devices in each of the first and second sub-arrays each comprise:
    a) two opposed, outer face surfaces that extend over the common base support and over the bendable cantilevered arms, and
    b) piezoelectric bimorph bending plates contained within each bendable cantilevered arm by said respective outer face surfaces,
    c) first and second outer conductive layers respectively forming part of the piezoelectric bimorph bending plate and extending generally over both of the two face surfaces of each of said cantilevered arms,
    wherein the conductive layers of each bendable cantilevered arm are electrically isolated from the conductive layers of adjacent, neighboring cantilevered arms for individual electrical accuation of each of said cantilevered arms.

5. A tactile stimulation display transducer device having a common base support and a plurality of individually actuatable bendable cantilevered arms mounted in line on said base support wherein:

a) each of said arms has skin engaging tip ends directed away from the base support for effecting tactile stimulation of a skin surface contacting such tip ends through deformation of the skin surface, b) the tip ends on each of said arms are independently displaceable, upon actuation, laterally to the line of said arms to positions that are out of alignment with the line of arms, which tin ends, upon displacement from their initial positions in the line of said arms, transfer a deforming force to skin surface contacted by such tip ends, tending to deform skin so contacted in a direction parallel to the skin surface and transversely to the line of arms, the common base support and a plurality of individually actuatable, bendable, cantilevered arms comprising:

i) two outer face surfaces that extend over the common base support and over the bendable cantilevered arms, ii) a piezoelectric bimorph bending plate contained between the two outer face surfaces within the bendable cantilevered arms of the tactile stimulation display transducer device, and iii) first and second outer conductive layers respectively forming part of the piezoelectric bimorph bending plate and extending generally over both of the two face surfaces of each of said cantilevered arms for individual electrical actuation of each of said cantilevered arms, wherein the conductive layers of each bendable cantilevered arm are electrically isolated from the conductive layers of adjacent, neighboring cantilevered arms whereby skin overlying the tip ends will tend to be stretched or compressed upon displacement of one or more of the tips.

6. An area tactile stimulation display device, or "area tactile display device", comprising a plurality of individual tactile stimulation display transducer devices as in claim 5, wherein said individual tactile stimulation display transducer devices are arranged in first and second sub-arrays wherein respective member devices of the first and second sub-arrays are positioned side by side to each other whereby skin overlying the tip ends will tend to be stretched or compressed towards adjacent tips upon displacement of one or more of the tips.

* * * * *